(12) United States Patent
Bahr et al.

(10) Patent No.: US 11,268,890 B2
(45) Date of Patent: Mar. 8, 2022

(54) PARAMETERS FOR USE IN PARTICLE DISCRIMINATION

(71) Applicant: Becton, Dickinson and Company, Franklin Lakes, NJ (US)

(72) Inventors: Matthew Bahr, Fremont, CA (US);
Eric D. Diebold, Menlo Park, CA (US);
Jonathan Lin, San Jose, CA (US);
Keegan Owsley, Campbell, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 83 days.

(21) Appl. No.: 16/817,331

(22) Filed: Mar. 12, 2020

(65) Prior Publication Data

US 2020/0309664 A1 Oct. 1, 2020

Related U.S. Application Data

(60) Provisional application No. 62/826,646, filed on Mar. 29, 2019.

(51) Int. Cl.
*G01N 15/02* (2006.01)
*G01N 15/14* (2006.01)

(52) U.S. Cl.
CPC ..... *G01N 15/0227* (2013.01); *G01N 15/1404* (2013.01)

(58) Field of Classification Search
CPC ........... G01N 15/0227; G01N 15/1404; G01N 2015/1006; G01N 2015/1461; G01N 15/147; G01N 15/1459

USPC ......................................................... 356/335
See application file for complete search history.

(56) References Cited

U.S. PATENT DOCUMENTS

| | | | |
|---|---|---|---|
| 4,352,558 A | * | 10/1982 | Eisert ................. G01N 15/1404 250/461.2 |
| 9,567,651 B2 | * | 2/2017 | Seth ...................... G06T 7/0012 |
| 9,625,388 B2 | * | 4/2017 | Ishisaka ............. G01N 21/6486 |
| 9,733,186 B2 | * | 8/2017 | Ishisaka ............... G01N 15/147 |

(Continued)

FOREIGN PATENT DOCUMENTS

CN 109141276 A 1/2019
WO WO2018231716 A2 12/2018

(Continued)

*Primary Examiner* — Roy M Punnoose
(74) *Attorney, Agent, or Firm* — Khin K. Chin; Bret E. Field; Bozicevic, Field & Francis LLP

(57) ABSTRACT

Aspects of the present disclosure include methods for characterizing particles of a sample in a flow stream. Methods according to certain embodiments include detecting light from a sample having cells in a flow stream, generating an image of an object in the flow stream in an interrogation region and determining whether the object in the flow stream is an aggregate based on the generated image. Systems having a processor with memory operably coupled to the processor having instructions stored thereon, which when executed by the processor, cause the processor to generate an image of an object in a flow stream and to determine whether the object is an aggregate are also described. Integrated circuit devices (e.g., field programmable gate arrays) having programming for practicing the subject methods are also provided.

20 Claims, 4 Drawing Sheets

(56) References Cited

U.S. PATENT DOCUMENTS

| | | | |
|---|---|---|---|
| 2004/0018629 A1* | 1/2004 | Kawate | G01N 33/54313 |
| | | | 436/63 |
| 2005/0148099 A1 | 7/2005 | Kawate et al. | |
| 2009/0029870 A1* | 1/2009 | Ward | G01N 29/222 |
| | | | 506/9 |
| 2010/0196917 A1* | 8/2010 | Ishisaka | G01N 15/147 |
| | | | 435/6.12 |
| 2014/0193892 A1 | 7/2014 | Mohan et al. | |
| 2014/0227682 A1* | 8/2014 | Seth | C12Q 1/70 |
| | | | 435/5 |
| 2014/0240669 A1* | 8/2014 | Imamura | A61B 3/1241 |
| | | | 351/206 |
| 2015/0015872 A1* | 1/2015 | Kole | G01N 21/278 |
| | | | 356/128 |
| 2016/0377525 A1 | 12/2016 | Foster et al. | |
| 2017/0268981 A1 | 9/2017 | Diebold et al. | |
| 2017/0322159 A1* | 11/2017 | Ishisaka | G01N 21/6486 |
| 2018/0059126 A1* | 3/2018 | Jones | A61B 5/055 |
| 2018/0327699 A1 | 11/2018 | Ota et al. | |
| 2019/0033291 A1* | 1/2019 | Okada | C12Q 1/68 |

FOREIGN PATENT DOCUMENTS

| | | |
|---|---|---|
| WO | WO2019209977 A1 | 10/2019 |
| WO | WO2020047468 A1 | 3/2020 |
| WO | WO2020081292 A1 | 4/2020 |

\* cited by examiner

2B)

2A)

PARAMETERS FOR USE IN PARTICLE DISCRIMINATION

CROSS-REFERENCE TO RELATED APPLICATION

This application is related to U.S. Provisional Patent Application Ser. No. 62/826,646 filed Mar. 29, 2019; the disclosure of which application is herein incorporated by reference.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cvells, in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest. To sort particles in the sample, a drop-charging mechanism charges droplets of the flow stream that contain a particle type to be sorted with an electrical charge at the break-off point of the flow stream. Droplets are passed through an electrostatic field and are deflected based on polarity and magnitude of charge on the droplet into one or more collection containers. Uncharged droplets are not deflected by the electrostatic field.

In particle sorting, aggregates (e.g., clumping of cells) can be prominent components of samples, affecting the accuracy and reproducibility of sorting protocols. In addition, mischaracterizing an aggregate of cells as a single cell reduces overall yield and purity of sorted cells, which can be harmful in particular when purity is critical to the ultimate use of a sorted cell composition (e.g., as a therapeutic). Clumping may occur due to incomplete disruption of tissues by mechanical or enzymatic break down into single cells, by the use of alcohol-based fixatives that induce clumping or by centrifugation. Clumping may also occur as an inherent attribute of certain cell types, such as keratinocytes.

SUMMARY

Aspects of the present disclosure include methods for characterizing particles of a sample in a flow stream. Methods according to certain embodiments include detecting light from a sample having cells in a flow stream, generating spatial data of an object in the flow stream in an interrogation region and determining whether the object in the flow stream is an aggregate based on the spatial data. Systems having a processor with memory operably coupled to the processor having instructions stored thereon, which when executed by the processor, cause the processor to generate spatial data of an object in a flow stream and to determine whether the object is an aggregate are also described. Integrated circuit devices (e.g., field programmable gate arrays) having programming for practicing the subject methods are also provided.

In embodiments, light from a sample in a flow stream is detected in an interrogation region and one or more images (e.g., frequency-encoded images) of objects in the flow stream are generated. In some embodiments, the objects imaged in the interrogation region include cells. In some embodiments, methods include detecting one or more of light absorption, light scatter, light emission (e.g., fluorescence) from the sample in the flow stream. In some instances, spatial data of one or more objects in the sample is generated from detected light absorption (e.g., brightfield image data). In other instances, spatial data of one or more objects in the sample is generated from detected light scatter (e.g., forward scatter image data, side scatter image data). In yet other instances, spatial data of one or more objects in the sample are generated from detected fluorescence (e.g., fluorescent marker image data). In still other instances, spatial data of one or more objects in the sample is generated from a combination of two or more of detected light absorption, detected light scatter and detected fluorescence.

In some embodiments, methods include determining the size of the object based on the spatial data. In other embodiments, methods include determining the center of mass of the object based on the spatial data. In yet other embodiments, methods include determining the eccentricity of the object based on the spatial data. In certain embodiments, an image moment is calculated based on the spatial data. In some instances, methods include calculating a first order image moment of the object along a horizontal axis. In other instances, methods include calculating a second order image moment of the object along a horizontal axis. In yet other instances, methods include calculating a first order image moment of the object along a vertical axis. In still other instances, methods include calculating a second order image moment of the object along a vertical axis.

In some embodiments, methods include generating an image of an object in the flow in an interrogation region. In some embodiments, the image is a greyscale image of the object. Methods according to certain embodiments include calculating an image moment of the object from the generated image. In some instances, methods include calculating a first order image moment of the object along a horizontal axis. In other instances, methods include calculating a second order image moment of the object along a horizontal axis. In yet other instances, methods include calculating a first order image moment of the object along a vertical axis. In still other instances, methods include calculating a second order image moment of the object along a vertical axis.

In some embodiments, one or more properties of the object is determined based on the calculated image moment and generated image. For example, methods may include determining the size of the object, the center of mass, the eccentricity of the object along a horizontal axis or vertical axis or a combination thereof. In some instances, methods include assessing one or more of the size, center of mass and eccentricity of the object and determining whether the object is a cell aggregate. In certain instances, the object is determined to be a cell aggregate based on the determined size and center of mass of the object. In other instances, the object is determined to be a cell aggregate based on the determined size and eccentricity of the object. In yet other instances, the object is determined to be a cell aggregate based on the determined center of mass and eccentricity of the object. In still other instances, the object is determined to be a cell aggregate based on the determined size, center of mass and eccentricity of the object. In certain instances, methods include comparing a first image of the object with a second image of the object and determining one or more properties of the object based on the comparison between the first image of the object with the second image of the object.

In determining whether the object is a cell aggregate, in certain instances, methods include: 1) assessing one or more properties of the object based on the calculated image moment and spatial data; and 2) assessing light scatter detector output signals from the object in the interrogation region of the flow stream. In some embodiments, the light scatter includes forward scattered light from the object. In other embodiments, the light scatter includes side scattered light from the object. In certain embodiments, methods include assessing the light scatter detector output signals for one or more of the pulse width, the pulse height and pulse area.

In some embodiments, methods include: 1) assessing one or more properties of the object based on the calculated image moment and generated image; and 2) assessing light scatter detector output signals from the object in the interrogation region of the flow stream. In some embodiments, the light scatter includes forward scattered light from the object. In other embodiments, the light scatter includes side scattered light from the object. In certain embodiments, methods include assessing the light scatter detector output signals for one or more of the pulse width, the pulse height and pulse area.

In certain embodiments, methods include generating an image mask of the object. To generate an image mask according to some instances, methods include generating a greyscale image of the object in the flow stream, determining a pixel intensity threshold value from the greyscale image, comparing each pixel from the greyscale image against the determined pixel intensity threshold value and converting each pixel to a binary pixel value. In one example, methods include detecting light absorption (e.g., brightfield image data) from the flow stream and assigning a pixel value of 1 to each pixel in the greyscale image when the pixel intensity is less than the threshold value and assigning a pixel value of 0 when the pixel intensity of the greyscale image is greater than the threshold value. In another example, methods include detecting light scatter from the cell in the flow stream and assigning a pixel value of 1 to each pixel in the greyscale image when the pixel intensity is greater than the threshold value and assigning a pixel value of 0 when the pixel intensity is less than the threshold value. In yet another example, methods include detecting fluorescence from the cell in the flow stream and assigning a pixel value of 1 to each pixel in the greyscale image when the pixel intensity is greater than the threshold value and assigning a pixel value of 0 when the pixel intensity is less than the threshold value. In some embodiments, the image mask is generated from the pixels having a binary pixel value of 1. In other embodiments, the image mask is generated from the pixels having a binary pixel value of 0.

In some embodiments, methods include determining the size of the object, the center of mass or the eccentricity of the object along a horizontal axis or vertical axis based on the generated image mask. In these embodiments, one or more of these parameters from the image mask are used to assess whether the object is a single cell or is a cell aggregate. In one example, methods include assessing the size and the center of mass of the object from the image mask to determine whether the object is a single cell or a cell aggregate. In another example, methods include assessing the eccentricity along a horizontal axis or vertical axis and the size of the object from the image mask to determine whether the object is a single cell or a cell aggregate. In yet another example, methods include assessing the eccentricity along a horizontal axis or vertical axis and the center of mass from the image mask to determine whether the object is a single cell or a cell aggregate.

In some embodiments, methods include identifying that the object is a cell aggregate. In some instances, methods include determining that the object is a horizontal cell aggregate where two or more cells are aligned together across a horizontal axis of the flow stream. In other instances, methods include determining that the object is a vertical cell aggregate where two or more cells are aligned together along a vertical axis (i.e., longitudinal axis) of the flow stream. In yet other instances, methods include determining that the object is combination cell aggregate having two or more cells aligned together across a horizontal axis and having two or more cells aligned together along a vertical axis.

In some embodiments, methods include calculating the spatial data from frequency-encoded fluorescence data from the object. In some instances, calculating the spatial data of the object includes performing a transform of the frequency-encoded fluorescence data. In one example, the spatial data is calculated by performing a Fourier transform (FT) of the frequency-encoded fluorescence data. In another example, the spatial data is calculated by performing a discrete Fourier transform (DFT) of the frequency-encoded fluorescence data. In yet another example, the spatial data is calculated by performing a short time Fourier transform (STFT) of the frequency-encoded fluorescence data. In still another example, the spatial data is calculated with a digital lock-in amplifier to heterodyne and de-multiplex the frequency-encoded fluorescence data.

Methods according to certain embodiments also include sorting the object. In some embodiments, the object is identified as being a single cell and is sorted to a first sample component collection location. In other embodiments, the object is identified as being a cell aggregate and is sorted to a second sample component collection location. In some instances, the first sample component collection location includes a sample collection container and the second sample component collection location includes a waste collection container.

Aspects of the present disclosure also include systems for characterizing particles of a sample (e.g., cells in a biological sample). Systems according to certain embodiments include a light source configured to irradiate a sample having cells in a flow stream, a light detection system having a photodetector and a processor having memory operably coupled to the processor such that the memory includes instructions stored thereon, which when executed by the processor, cause the processor to generate spatial data of an object in the flow stream in an interrogation region and to determine whether the object in the flow stream is a cell aggregate based on the spatial data. In embodiments, the light detection system includes one or more photodetectors for detecting light absorption, light scatter, fluorescence or a combination thereof.

In some embodiments, systems include a processor with memory operably coupled to the processor such that the memory includes instructions stored thereon, which when executed by the processor, cause the processor to determine the size of the object based on the spatial data. In other embodiments, the memory includes instructions for determining the center of mass of the object based on the spatial data. In yet other embodiments, the memory includes instructions for determining the eccentricity of the object based on the spatial data. In certain embodiments, the memory includes instructions for calculating an image moment based on the spatial data. In some instances, the memory includes instructions for calculating a first order image moment of the object along a horizontal axis. In other instances, the memory includes instructions for calculating a second order image moment of the object along a horizontal axis. In yet other instances, the memory includes instructions for calculating a first order image moment of the object along a vertical axis. In still other instances, the memory includes instructions for calculating a second order image moment of the object along a vertical axis.

In some embodiments, systems include a processor with memory operably coupled to the processor such that the memory includes instructions stored thereon, which when executed by the processor, cause the processor to generate an image of an object in the flow stream. In some embodiments, the memory includes instructions for generating a greyscale image of the object in the flow stream. In some embodiments, systems include a computer program that includes instructions for generating the image from detected light absorption (e.g., brightfield image data) from the object in the flow stream. In other embodiments, systems include a computer program that includes instructions for generating the image from detected light scatter (e.g., forward scatter image data, side scatter image data) from the object in the flow stream. In yet other embodiments, systems include a computer program that includes instructions for generating the image from detected fluorescence (e.g., fluorescent marker image data) from the object in the flow stream. In still other instances, systems include a computer program that includes instructions for generating an image of the object from a combination of two or more of detected light absorption, detected light scatter and detected fluorescence.

In some embodiments, the memory includes instructions which when executed by the processor cause the processor to calculate an image moment of the object from the generated image. In some instances, systems include a computer program that includes instructions for calculating a first order image moment of the object along a horizontal axis. In other instances, systems include a computer program that includes instructions for calculating a second order image moment of the object along a horizontal axis. In yet other instances, systems include a computer program that includes instructions for calculating a first order image moment of the object along a vertical axis. In still other instances, systems include a computer program that includes instructions for calculating a second order image moment of the object along a vertical axis.

Systems of interest may also include memory having instructions which when executed by the processor, cause the processor to determine one or more properties of the object in the flow stream based on the calculated image moment and generated image. In these embodiments, the memory may include instructions for determining the size of the object, the center of mass of the object or the eccentricity of the object along a horizontal axis or a vertical axis or a combination thereof. In some embodiments, systems include a computer program that includes instructions for assessing one or more of the size, center of mass and eccentricity of the object and determining whether the object is a cell aggregate. In one example, systems include a computer program that includes instructions for determining that the object is a cell aggregate based on the determined size and center of mass of the object. In another example, systems include a computer program that includes instructions for determining that the object is a cell aggregate based on the determined size and eccentricity of the object. In yet another example, systems include a computer program that includes instructions for determining that the object is a cell aggregate based on the determined center of mass and eccentricity of the object. In still another example, systems include a computer program that includes instructions for determining that the object is a cell aggregate based on the determined size, center of mass and eccentricity of the object. In certain instances, systems include a computer program that includes instructions for comparing a first image of the object with a second image of the object and determining one or more properties of the object based on the comparison between the first image of the object with the second image of the object.

In certain instances, systems include a computer program that includes instructions for: 1) assessing one or more properties of the object based on the calculated image moment and spatial data; and 2) assessing light scatter detector output signals from the object in the interrogation region of the flow stream. In some embodiments, systems are configured to assess output signals from a forward scatter light detector. In other embodiments, systems are configured to assess output signals from a side scatter light detector. In certain embodiments, systems include a computer program that includes instructions for assessing the light scatter detector output signals for one or more of the pulse width, the pulse height and pulse area.

In certain instances, systems include a computer program that includes instructions for: 1) assessing one or more properties of the object based on the calculated image moment and generated image; and 2) assessing light scatter detector output signals from the object in the interrogation region of the flow stream. In some embodiments, systems are configured to assess output signals from a forward scatter light detector. In other embodiments, systems are configured to assess output signals from a side scatter light detector. In certain embodiments, systems include a computer program that includes instructions for assessing the light scatter detector output signals for one or more of the pulse width, the pulse height and pulse area.

In certain embodiments, systems of interest also include memory having instructions which when executed by the processor, cause the processor to generate an image mask of the object. In these embodiments, the system includes a computer program having instructions for: 1) generating a greyscale image of the object in the flow stream; 2) determining a pixel intensity threshold value from the greyscale image; 3) comparing each pixel from the greyscale image against the determined pixel intensity threshold value and 4) converting each pixel to a binary pixel value. In one example, the system includes a computer program having instructions for detecting light absorption (e.g., brightfield image data) from the flow stream and assigning a pixel value of 1 to each pixel in the greyscale image when the pixel intensity is less than the threshold value and assigning a pixel value of 0 when the pixel intensity of the greyscale image is greater than the threshold value. In another example, the system includes a computer program having instructions for detecting light scatter from the cell in the flow stream and assigning a pixel value of 1 to each pixel in the greyscale image when the pixel intensity is greater than the threshold value and assigning a pixel value of 0 when the pixel intensity is less than the threshold value. In yet another example, the system includes a computer program having instructions for detecting fluorescence from the cell in the flow stream and assigning a pixel value of 1 to each pixel in the greyscale image when the pixel intensity is greater than the threshold value and assigning a pixel value of 0 when the pixel intensity is less than the threshold value. In some embodiments, the system is configured to generate the image mask from the pixels having a binary pixel value of 1. In other embodiments, the system is configured to generate the image mask from the pixels having a binary pixel value of 0.

The subject systems are configured, according to certain instances, to discriminate between objects in the sample. In some instances, the system includes a computer program having instructions for determining the size of the object, the center of mass or the eccentricity of the object along a horizontal axis or vertical axis based on the generated image mask. In these instances, the subject system uses one or more of these parameters from the image mask to assess whether the object is a single cell or is a cell aggregate. In one example, the system includes a computer program having instructions for assessing the size and the center of mass of the object from the image mask and determining whether the object is a single cell or a cell aggregate. In another example, the system includes a computer program having instructions for assessing the eccentricity along a horizontal axis or vertical axis and the size of the object from the image mask and determining whether the object is a single cell or a cell aggregate. In yet another example, the system includes a computer program having instructions for assessing the eccentricity along a horizontal axis or vertical axis and the center of mass of the object from the image mask and determining whether the object is a single cell or a cell aggregate.

In some embodiments, systems of interest include memory having instructions which when executed by the processor, cause the processor to identify that the object is a cell aggregate. In some instances, systems are configured to classify the object as being a horizontal cell aggregate where two or more cells are aligned together across a horizontal axis of the flow stream. In other instances, systems are configured to classify the object as being a vertical cell aggregate where two or more cells are aligned together along a vertical axis (i.e., longitudinal axis) of the flow stream. In yet other instances, systems are configured to classify the object as being a combination cell aggregate having two or more cells aligned together across a horizontal axis and having two or more cells aligned together along a vertical axis.

In some embodiments, systems of interest include memory having instructions which when executed by the processor, cause the processor to calculate the spatial data from frequency-encoded fluorescence data from the object. In some instances, calculating the spatial data of the object includes performing a transform of the frequency-encoded fluorescence data. In one example, the spatial data is calculated by performing a Fourier transform (FT) of the frequency-encoded fluorescence data. In another example, the spatial data is calculated by performing a discrete Fourier transform (DFT) of the frequency-encoded fluorescence data. In yet another example, the spatial data is calculated by performing a short time Fourier transform (SIFT) of the frequency-encoded fluorescence data. In still another example, the spatial data is calculated with a digital lock-in amplifier to heterodyne and de-multiplex the frequency-encoded fluorescence data.

Systems of interest are configured for sorting particles of a sample (e.g., a biological sample) in the flow stream. In some embodiments, systems further include a particle sorting component having a sample fluid delivery subsystem and a sheath fluid delivery subsystem that is in fluid communication with an inlet of the particle sorting component and one or more sample collection containers for receiving the sorted object from the flow stream. In certain instances, the object is determined to be a cell aggregate and the sorting component is configured to direct the cell aggregate to a waste collection outlet (e.g., waste conduit or container). In other instances, the object is determined to be a single cell and the sorting component is configured to direct the single cell to a sample collection container.

Aspects of the present disclosure also include integrated circuit devices programmed to: generate spatial data of an object in a flow stream in an interrogation region; and determine whether the object in the flow stream is a cell aggregated based on the spatial data. In some embodiments, integrated circuit devices are programmed to sort the object, such as to a waste collection container when the object is determined to be a cell aggregate or to a sample collection container when the object is determined to be a single cell. Integrated circuit devices of interest may include, in certain instances, a field programmable gate array (FPGA), an application specific integrated circuit (ASIC) or a complex programmable logic device (CPLD).

Integrated circuit devices according to certain embodiments are programmed to generate spatial data of an object in the flow stream. In some embodiments, the integrated circuit device is programmed to generate spatial data from data signals from a light absorption detector (e.g., brightfield image data). In other embodiments, the integrated circuit device is programmed to generate spatial data from data signals from a light scatter detector (e.g., forward scatter image data, side scatter image data). In yet other embodiments, the integrated circuit device is programmed to generate spatial data from data signals from a light emission detector (e.g., fluorescent marker image data). In still other instances, the integrated circuit device is programmed to generate spatial data of the object from a combination of two or more of detected light absorption, detected light scatter and detected fluorescence.

In some embodiments, the integrated circuit device is programmed for determining the size of the object based on the spatial data. In other embodiments, integrated circuit device is programmed for determining the center of mass of the object based on the spatial data. In yet other embodiments, integrated circuit device is programmed for determining the eccentricity of the object based on the spatial data. In certain embodiments, an image moment is calculated based on the spatial data. In some instances, integrated circuit device is programmed for calculating a first order image moment of the object along a horizontal axis. In other instances, integrated circuit device is programmed for calculating a second order image moment of the object along a horizontal axis. In yet other instances, integrated circuit device is programmed for calculating a first order image moment of the object along a vertical axis. In still other instances, integrated circuit device is programmed for calculating a second order image moment of the object along a vertical axis.

In some embodiments, the integrated circuit device is programmed to calculate an image moment of the object from the generated image. In some instances, the integrated circuit device is programmed to calculate a first order image moment of the object along a horizontal axis. In other instances, the integrated circuit device is programmed to calculate a second order image moment of the object along a horizontal axis. In yet other instances, the integrated circuit device is programmed to calculate a first order image moment of the object along a vertical axis. In still other instances, the integrated circuit device is programmed to calculate a second order image moment of the object along a vertical axis.

In some embodiments, the integrated circuit device is programmed to determine one or more properties of the object in the flow stream based on the calculated image moment and generated image. In these embodiments, the integrated circuit device is programmed to determine the size of the object, the center of mass of the object or the eccentricity of the object along a horizontal axis or a vertical axis or a combination thereof. In some embodiments the integrated circuit device is programmed to assess one or more of the size, center of mass and eccentricity of the object and determine whether the object is a cell aggregate. In one example, the integrated circuit device is programmed to determine that the object is a cell aggregate based on the determined size and center of mass of the object. In another example, the integrated circuit device is programmed to determine that the object is a cell aggregate based on the determined size and eccentricity of the object. In yet another example, systems include the integrated circuit device is programmed to determine that the object is a cell aggregate based on the determined center of mass and eccentricity of the object. In still another example, the integrated circuit device is programmed to determine that the object is a cell aggregate based on the determined size, center of mass and eccentricity of the object. In certain instances, the integrated circuit device is programmed to compare a first image of the object with a second image of the object and determine one or more properties of the object based on the comparison between the first image of the object with the second image of the object.

In certain instances, the integrated circuit device is programmed to: 1) assess one or more properties of the object based on the calculated image moment and spatial data; and 2) assess light scatter detector output signals from the object in the interrogation region of the flow stream. In some embodiments, the integrated circuit device is programmed to assess output signals from a forward scatter light detector. In other embodiments, the integrated circuit device is programmed to assess output signals from a side scatter light detector. In certain embodiments, the integrated circuit device is programmed to assess the light scatter detector output signals for one or more of the pulse width, the pulse height and pulse area.

In certain instances, the integrated circuit device is programmed to: 1) assess one or more properties of the object based on the calculated image moment and generated image; and 2) assess light scatter detector output signals from the object in the interrogation region of the flow stream. In some embodiments, the integrated circuit device is programmed to assess output signals from a forward scatter light detector. In other embodiments, the integrated circuit device is programmed to assess output signals from a side scatter light detector. In certain embodiments, the integrated circuit device is programmed to assess the light scatter detector output signals for one or more of the pulse width, the pulse height and pulse area.

In certain embodiments, the integrated circuit device is programmed to generate an image mask of the object. In these embodiments, the integrated circuit device is programmed to: 1) generate a greyscale image of the object in the flow stream; 2) determine a pixel intensity threshold value from the greyscale image; 3) compare each pixel from the greyscale image against the determined pixel intensity threshold value and 4) convert each pixel to a binary pixel value. In one example, the integrated circuit device is programmed to receive data signals from a light absorption detector (e.g., brightfield image data) and assign a pixel value of 1 to each pixel in the greyscale image when the pixel intensity is less than the threshold value and assigning a pixel value of 0 when the pixel intensity of the greyscale image is greater than the threshold value. In another example, the integrated circuit device is programmed to receive data signals from a light scatter detector and assign a pixel value of 1 to each pixel in the greyscale image when the pixel intensity is greater than the threshold value and assigning a pixel value of 0 when the pixel intensity is less than the threshold value. In yet another example, the integrated circuit device is programmed to receive data signals from a fluorescence detector and assign a pixel value of 1 to each pixel in the greyscale image when the pixel intensity is greater than the threshold value and assigning a pixel value of 0 when the pixel intensity is less than the threshold value. In some embodiments, the integrated circuit device is programmed to generate the image mask from the pixels having a binary pixel value of 1. In other embodiments, the integrated circuit device is programmed to generate the image mask from the pixels having a binary pixel value of 0.

In some instances, the integrated circuit device is programmed to determine the size of the object, the center of mass or the eccentricity of the object along a horizontal axis or vertical axis based on the generated image mask. In these instances, the integrated circuit device uses data signals corresponding to one or more of these parameters from the image mask to assess whether the object is a single cell or is a cell aggregate. In one example, the integrated circuit device is programmed to assess the size and the center of mass of the object from the image mask and determine whether the object is a single cell or a cell aggregate. In another example, the integrated circuit device is programmed to assess the eccentricity along a horizontal axis or vertical axis and the size of the object from the image mask and determine whether the object is a single cell or a cell aggregate. In yet another example, the integrated circuit device is programmed to assess the eccentricity along a horizontal axis or vertical axis and the center of mass of the object from the image mask and determine whether the object is a single cell or a cell aggregate.

In some embodiments, the integrated circuit device is programmed to identify that the object is a cell aggregate. In some instances, the integrated circuit device is programmed to classify the object as being a horizontal cell aggregate where two or more cells are aligned together across a horizontal axis of the flow stream. In other instances, the integrated circuit device is programmed to classify the object as being a vertical cell aggregate where two or more cells are aligned together along a vertical axis (i.e., longitudinal axis) of the flow stream. In yet other instances, the integrated circuit device is programmed to classify the object as being a combination cell aggregate having two or more cells aligned together across a horizontal axis and having two or more cells aligned together along a vertical axis.

BRIEF DESCRIPTION OF THE FIGURES

The invention may be best understood from the following detailed description when read in conjunction with the accompanying drawings. Included in the drawings are the following figures:

FIGS. 1, 1A and 1B depict images of cell aggregates according to certain embodiments. FIG. 1A depicts an image of a vertically oriented cell aggregate having two cells aligned together along a vertical axis. FIG. 1B depicts an image of a horizontally oriented cell aggregate having two cells aligned together along a horizontal axis.

FIGS. 2, 2A and 2B depict the use of calculated eccentricity to discriminate between a single cell and an aggregate of cells according to certain embodiments. FIG. 2A depicts an imaged single cell. FIG. 2B depicts an imaged cell aggregate.

DETAILED DESCRIPTION

Figure 1:
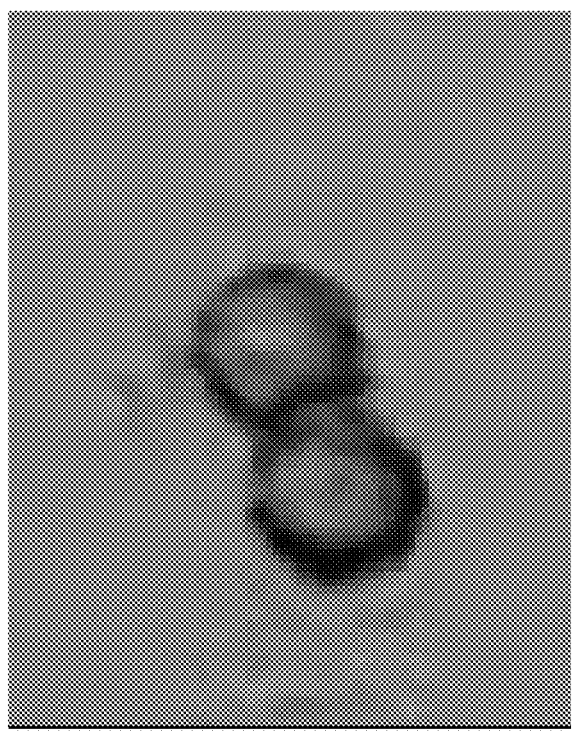
Figure 1:
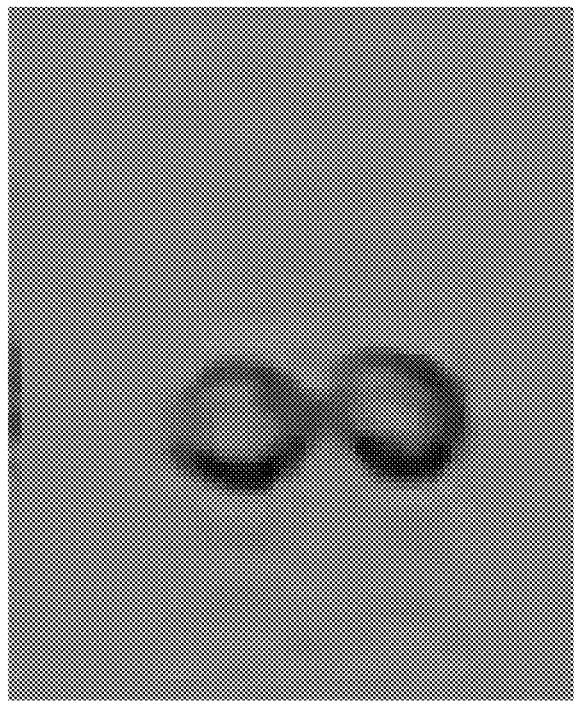

Aspects of the present disclosure include methods for characterizing particles of a sample in a flow stream. Methods according to certain embodiments include detecting light from a sample having cells in a flow stream, generating an image of an object in the flow stream in an interrogation region and determining whether the object in the flow stream is an aggregate based on the generated image. Systems having a processor with memory operably coupled to the processor having instructions stored thereon, which when executed by the processor, cause the processor to generate an image of an object in a flow stream and to determine whether the object is an aggregate are also described. Integrated circuit devices (e.g., field programmable gate arrays) having programming for practicing the subject methods are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides systems and methods for determining whether an object in a flow stream is a cell aggregate.

In further describing embodiments of the disclosure, methods for generating spatial data of the object in a flow stream and determining whether the object is a cell aggregate based on the spatial data are first described in greater detail. Next, systems for characterizing objects in a flow stream and separating particles in a sample in real time are described. Integrated circuit devices, such as field programmable gate arrays having programming for generating spatial data of the object in the flow stream, classifying the object as being a cell aggregate or a single cell and sorting the cell aggregate or single cell are also provided.

Methods for Characterizing Particles in a Sample

Aspects of the present disclosure include methods for characterizing particles of a sample (e.g., cells in a biological sample). In practicing methods according to certain embodiments, a sample having cells in a flow stream is irradiated with a light source and light from the sample is detected to generate spatial data of an object in the flow stream in an interrogation region and to determine whether the object is an aggregate of particles (e.g., aggregate of cells) based on the spatial data. In embodiments, methods include discriminating between single cells and an aggregate of two or more cells based on the spatial data of the object.

The term "spatial data" is used herein to describe data signals encoding spatial positions of the irradiated interrogation region of the flow stream. As described in greater detail below, in some embodiments the spatial data is calculated from frequency-encoded fluorescence data from the object in the flow stream, such as a by performing a transform of frequency-encoded fluorescence data (e.g., performing a Fourier transform or calculating the spatial data with a digital lock-in amplifier to heterodyne and de-multiplex the frequency-encoded fluorescence data) In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample having cells (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, super-luminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the flow stream with one or more lasers. As discussed above, the type and number of lasers will vary depending on the sample as well as desired light collected and may be a pulsed laser or continuous wave laser. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

The sample in the flow stream may be irradiated with one or more of the above-mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In practicing the subject methods, light from the irradiated sample is measured, such as by collecting light from the sample over a range of wavelengths (e.g., 200 nm 1000 nm). In embodiments, methods may include one or more of measuring light absorption by the sample (e.g., brightfield light data), measuring light scatter (e.g., forward or side scatter light data) and measuring light emission by the sample (e.g., fluorescence light data).

Light from the sample may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

Light may be collected over one or more of the wavelength ranges of 200 nm 1200 nm. In some instances, methods include measuring the light from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of certain fluorophores.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, light from the sample is measured 2 or more times, with the data in certain instances being averaged.

In some embodiments, methods include further adjusting the light from the sample before detecting the light. For example, the light from the sample source may be passed through one or more lenses, mirrors, pinholes, slits, gratings, light refractors, and any combination thereof. In some instances, the collected light is passed through one or more focusing lenses, such as to reduce the profile of the light. In other instances, the emitted light from the sample is passed through one or more collimators to reduce light beam divergence.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µM or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. Nature Photonics Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, methods include generating spatial data of an object in the flow stream from the detected light. The spatial data of the object may be generated from detected light absorption, detected light scatter, detected light emission or any combination thereof. In some instances, the spatial data of the object is generated from light absorption detected from the sample, such as from a brightfield light detector. In other instances, the spatial data of the object is generated from light scatter detected from the sample, such as from a side scatter detector, a forward scatter detector or a combination of a side scatter detector and forward scatter detector. In yet other instances, the spatial data of the object is generated from emitted light from the sample, such as light from fluorophores added to the sample. In still other instances, the spatial data of the object is generated from a combination of detected light absorption, detected light scatter and detected light emission.

In certain embodiments, the spatial data is calculated from frequency-encoded data (e.g., frequency-encoded fluorescence data). In these embodiments, the frequency-encoded data is generated by detecting light from an object irradiated with a plurality of frequency shifted beams of light and a local oscillator beam. In one example, a plurality of positions across (a horizontal axis) the flow stream are irradiated by a laser beam that includes a local oscillator beam and a plurality of radiofrequency-shifted laser beams such that different locations across the flow stream are irradiated by the local oscillator beam and one of the radiofrequency-shifted beams. In some instances, the local oscillator is a frequency-shifted beam of light from a laser. In this example, each spatial location across the particle in the flow stream is characterized by a different beat frequency which corresponds to the difference between the frequency of the local oscillator beam and the frequency of the radiofrequency-shifted beam at that location. In some embodiments, frequency-encoded data from the object includes spatially encoded beat frequencies across a horizontal axis of the particle in the flow stream.

In embodiments, the spatial data may be calculated from the frequency-encoded data by performing a transform of frequency-encoded data. In one example, the spatial data is calculated by performing a Fourier transform (FT) of the frequency-encoded data. In another example, the spatial data is calculated by performing a discrete Fourier transform (DFT) of the frequency-encoded data. In yet another example, the spatial data is calculated by performing a short time Fourier transform (STFT) of the frequency-encoded data. In still another example, the spatial data is calculated with a digital lock-in amplifier to heterodyne and de-multiplex the frequency-encoded data.

In some embodiments, methods include generating an image of an object in the flow stream from the detected light. The image of the object may be generated from detected light absorption, detected light scatter, detected light emission or any combination thereof. In some instances, the image of the object is generated from light absorption detected from the sample, such as from a brightfield light detector. In these instances, the image of the object is generated based on brightfield image data from the cell in the flow stream. In other instances, the image of the object is generated from light scatter detected from the sample, such as from a side scatter detector, a forward scatter detector or a combination of a side scatter detector and forward scatter detector. In these instances, the image of the object is generated based on scattered light image data. In yet other instances, the image of the object is generated from emitted light from the sample, such as light from fluorophores added to the sample. In these instances, the image of the object is generated based on fluorescent image data (i.e., imaging data from fluorescent compounds on or in the cell). In still other instances, the image of the object is generated from a combination of detected light absorption, detected light scatter and detected light emission.

One or more images of the object may be generated from the detected light. In some embodiments, a single image is generated from each form of detected light. For example, a first image of the object is generated from detected light absorption; a second image of the object is generated from detected light scatter and a third image of the object is generated from detected light emission. In other embodiments, two or more images are generated from each form of detected light, such as 3 or more, such as 4 or more, such as 5 or more and including 10 or more images or a combination thereof.

In certain embodiments, methods include generating an image mask of the object in the flow stream. In these embodiments, the image mask may be first generated from a greyscale image of the object in the flow stream. The term "greyscale" is used herein in its conventional sense to refer to images of the object in the flow stream that are composed of varying shades of gray that are based on the intensity of light at each pixel. In embodiments, a pixel intensity threshold is determined from the greyscale image where the pixel intensity threshold value is used to convert each pixel into a binary value that is used to generate the image mask of the object, as described in greater detail below. In some embodiments, the pixel intensity threshold is determined by minimizing the intra-class variance of the greyscale image and calculating a pixel intensity threshold that is based on the minimized intra-class variance. In some embodiments, the pixel intensity threshold is determined with an algorithm where the detected light data includes two classes of pixels following a bimodal histogram (having foreground pixels and background pixels), calculating an optimum threshold separating the two classes so that their combined intra-class variance is minimal. In other embodiments, methods include calculating an optimum threshold separating the two classes so that their inter-class variance is maximum.

In generating the image mask, each pixel in the greyscale image of the object is compared against the determined intensity threshold value and converted to a binary pixel value. Each pixel in the greyscale image of the object may be compared against the determined intensity threshold value in any order as desired. In some embodiments, pixels along each horizontal row in the greyscale image of the object are compared against the determined intensity threshold value. In some instances, each pixel is compared against the determined intensity threshold value from the left side of the greyscale image of the object to the right side of the greyscale image of the object. In other instances, each pixel is compared against the determined intensity threshold value from the right side of the greyscale image of the object to the left side of the greyscale image of the object. In other embodiments, pixels along each vertical column in the greyscale image of the object are compared against the determined intensity threshold value. In some instances, each pixel is compared against the determined intensity threshold value from the top of the greyscale image of the object to the bottom of the greyscale image of the object along each vertical column. In other instances, each pixel is compared against the determined intensity threshold value from the bottom of the greyscale image of the object to the top of the greyscale image of the object along each vertical column.

Depending on the size of the object in the flow stream being imaged and the optics used to collect the light from the sample (described in greater detail below), all of part of the pixels in the greyscale image of the object may be compared against the intensity threshold value. For example, in practicing the subject methods 50% or more of the pixels in the greyscale image of the object may be compared against the intensity threshold value, such as 60% or more, such as 70% or more, such as 80% or more, such as 90% or more, such as 95% or more, such as 97% or more and including 99% or more of the pixels in the greyscale image of the object. In certain embodiments, all (100%) of the pixels in the greyscale image of the object are compared against the intensity threshold value.

As summarized above, each pixel in the greyscale image of the object is converted to a binary pixel value. Depending on the type of light detected, each pixel is assigned a binary pixel value of 1 or a binary pixel value of 0. In one example, methods include detecting light absorption (e.g., brightfield image data) from the flow stream and assigning a binary pixel value of 1 to each pixel in the greyscale image of the object when the pixel intensity is less than the intensity threshold value and assigning a binary pixel value of 0 when the pixel intensity of the greyscale image of the object is greater than the intensity threshold value. In another example, methods include detecting light scatter from the object in the flow stream and assigning a binary pixel value of 1 to each pixel in the greyscale image when the pixel intensity is greater than the intensity threshold value and assigning a binary pixel value of 0 when the pixel intensity is less than the intensity threshold value. In yet another example, methods include detecting fluorescence from the object in the flow stream and assigning a binary pixel value of 1 to each pixel in the greyscale image of the object when the pixel intensity is greater than the intensity threshold value and assigning a binary pixel value of 0 when the pixel intensity is less than the intensity threshold value.

Where a binary pixel value is assigned to each pixel in the greyscale image of the object across a horizontal row, in some embodiments methods further include determining the first pixel across the horizontal row having a binary pixel value of 1 and determining the last pixel in the horizontal row having a binary pixel value of 1. In one example, methods include determining the first pixel from the left side of the horizontal row having an assigned binary pixel value of 1 and determining the last pixel from the left side of horizontal row having an assigned binary pixel value of 1. In another example, methods include determining the first pixel from the right side of the horizontal row having an assigned binary pixel value of 1 and determining the last pixel from the right side of horizontal row having an assigned binary pixel value of 1. In other embodiments, methods further include determining the first pixel across the horizontal row having a binary pixel value of 0 and determining the last pixel in the horizontal row having a binary pixel value of 0. In one example, methods include determining the first pixel from the left side of the horizontal row having an assigned binary pixel value of 0 and determining the last pixel from the left side of horizontal row having an assigned binary pixel value of 0. In another example, methods include determining the first pixel from the right side of the horizontal row having an assigned binary pixel value of 0 and determining the last pixel from the right side of horizontal row having an assigned binary pixel value of 0.

Where a binary pixel value is assigned to each pixel in the greyscale image of the object along a vertical column, in some embodiments methods further include determining the first pixel along the vertical column having a binary pixel value of 1 and determining the last pixel along the vertical column having a binary pixel value of 1. In one example, methods include determining the first pixel from the top of the vertical column having an assigned binary pixel value of 1 and determining the last pixel from the top of the vertical column having an assigned binary pixel value of 1. In another example, methods include determining the first pixel from the bottom of the vertical column having an assigned binary pixel value of 1 and determining the last pixel from the bottom of the vertical column having an assigned binary pixel value of 1. In other embodiments, methods further include determining the first pixel along a vertical column having a binary pixel value of 0 and determining the last pixel in the vertical column having a binary pixel value of 0. In one example, methods include determining the first pixel from the top of the vertical column having an assigned binary pixel value of 0 and determining the last pixel from the top of the vertical column having an assigned binary pixel value of 0. In another example, methods include determining the first pixel from the bottom of the vertical column having an assigned binary pixel value of 0 and determining the last pixel from bottom of the vertical column having an assigned binary pixel value of 0.

In some embodiments, methods include assessing one or more characteristics of the object based on the spatial data. For example, methods may include determining the size of the object, the center of mass of the object, the eccentricity of the object along a horizontal axis or vertical axis or a combination thereof based on the spatial data. In some instances, methods include assessing one or more of the size, center of mass and eccentricity based on the spatial data of the object and determining whether the object is a cell aggregate. In certain instances, the object is determined to be a cell aggregate based on the size and center of mass of the object. In other instances, the object is determined to be a cell aggregate based on the determined size and eccentricity of the object. In yet other instances, the object is determined to be a cell aggregate based on the determined center of mass and eccentricity of the object. In still other instances, the object is determined to be a cell aggregate based on the determined size, center of mass and eccentricity of the object.

In some embodiments, methods include assessing one or more characteristics of the object based on the generated image. For example, methods may include determining the size of the object, the center of mass of the object, the eccentricity of the object along a horizontal axis or vertical axis or a combination thereof based on the generated image. In some instances, methods include assessing one or more of the size, center of mass and eccentricity based on the generated image of the object and determining whether the object is a cell aggregate. In certain instances, the object is determined to be a cell aggregate based on the size and center of mass of the object. In other instances, the object is determined to be a cell aggregate based on the determined size and eccentricity of the object. In yet other instances, the object is determined to be a cell aggregate based on the determined center of mass and eccentricity of the object. In still other instances, the object is determined to be a cell aggregate based on the determined size, center of mass and eccentricity of the object.

In some embodiments, methods further include calculating an image moment of the object. The term "image moment" is used herein in its conventional sense to refer to a weighted average of the spatial data or pixel intensities in an image (e.g., generated image or generated image mask). As described below, the determined image moment may be used to calculate total intensity of the pixels of the object, the total area occupied by object, the centroid (i.e., geometric center) of the object as well as the orientation of the object (e.g., in the image or image mask). In some embodiments, the image moment is calculated according to:

$$M_{m,n} = \Sigma(x-\bar{x})^m (y-\bar{y})^n \text{Im}(x,y) = M \cdot \text{Im}(x,y)$$

where m is the image moment computed along the x-axis; and n is the image moment computed along the y-axis. In some instances, methods include calculating a first order image moment of the object along a horizontal axis. In other instances, methods include calculating a second order image moment of the object along a horizontal axis. In yet other instances, methods include calculating a first order image moment of the object along a vertical axis. In still other instances, methods include calculating a second order image moment of the object along a vertical axis.

In some embodiments, one or more properties of the object are determined based on the calculated image moment and spatial data. For example, methods may include determining the size of the cell, the center of mass of the cell or the eccentricity of the cell based on the calculated image moment and spatial data. In these embodiments, methods include calculating one or more image moments and then determining the characteristic of the cell using both the calculated image moment and the spatial data.

In some embodiments, one or more properties of the object are determined based on the calculated image moment and generated image. For example, methods may include determining the size of the cell, the center of mass of the cell or the eccentricity of the cell based on the calculated image moment and generated image of the object (e.g., image or image mask). In these embodiments, methods include calculating one or more image moments and then determining the characteristic of the cell using both the calculated image moment and the image of the object.

In some instances, the center of mass may be calculated from the image moment and the generated image of the object. For example, the center of mass of the object may be determined from the calculated image moment and the generated image according to:

$$\text{Center of Mass} = \frac{M_{1,0}}{M_{0,0}}$$

In other instances, the orientation of the object may be calculated from the image moment and the generated image of the object. For example, the orientation of the object may be determined from the calculated image moment and the generated image according to:

$$\text{Orientation of cell} = \frac{1}{2}\arctan\frac{2\left(M_{1,1} - \frac{M_{1,0}M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In still other instances, the eccentricity of the object may be calculated from the image moment and the generated image of the object. For example, the eccentricity of the object may be determined from the calculated image moment and the generated image according to:

$$\text{Eccentricity} = \frac{M_{2,0} - \frac{M_{2,0}^2}{M_{0,0}} + M_{0,2} - \frac{M_{0,2}^2}{M_{0,0}} - \sqrt{4\left(M_{1,1} - \frac{M_{1,0}M_{0,1}}{M_{0,0}}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}} + M_{0,2} - \frac{M_{0,2}^2}{M_{0,0}} + \sqrt{4\left(M_{1,1} - \frac{M_{1,0}M_{0,1}}{M_{0,0}}\right)^2 + \left(M_{2,0} - \frac{M_{2,0}^2}{M_{0,0}} - M_{0,2} + \frac{M_{0,2}^2}{M_{0,0}}\right)^2}}$$

In some embodiments, methods include assessing one or more of: 1) the calculated size of the object; 2) the center of mass of the object; and 3) the eccentricity of the object and identifying whether the object is an aggregate of particles (e.g., a cell aggregate) or a single particle (e.g., a single cell). In some instances, the object is determined to be an aggregate based on the calculated size of the object. In one example, the calculated size of the object is compared to a predetermined size for cells of interest to classify the object as being a single particle (e.g., single cell) or an aggregate. In this example, the predetermined size may be determined using standard calibration sample or reference size data. In another example, the calculated size of the object is compared to a threshold value such that where the object is determined to have a size greater than the threshold value, the object is classified as being an aggregate.

In other instances, the object is determined to be an aggregate based on the calculated center of mass of the object. In one example, the calculated center of mass of the object is compared to a predetermined center of mass for cells of interest to classify the object as being a single particle (e.g., single cell) or an aggregate. In this example, the predetermined center of mass may be determined using standard calibration sample or reference center of mass data of the cells of interest.

In yet other instances, the object is determined to be an aggregate based on the calculated eccentricity of the object. In one example, the calculated eccentricity of the object is compared to a predetermined eccentricity for cells of interest to classify the object as being a single particle (e.g., single cell) or an aggregate. In this example, the predetermined eccentricity may be determined using standard calibration sample or reference eccentricity data of the cells of interest.

In certain instances, the object is identified to be an aggregate based on the determined size and center of mass of the object. In other instances, the object is identified to be an aggregate based on the determined size and eccentricity of the object. In yet other instances, the object is identified to be an aggregate based on the determined center of mass and eccentricity of the object. In still other instances, the object is identified to be an aggregate based on the determined size, center of mass and eccentricity of the object.

In determining whether the object is an aggregate (e.g., cell aggregate), in certain instances, methods include: 1) assessing one or more properties of the object based on the calculated image moment and spatial data; and 2) assessing a light scatter detector output signal from the object in the interrogation region of the flow stream. In these embodiments, light scatter detector output signal may be a forward light scatter detector output or a side light scatter detector output or a combination thereof. In embodiments, the light scatter detector output signal may be a signal pulse width, a signal pulse height and a signal pulse area or a combination thereof. In one example, methods include assessing one or more properties of the object (size, center of mass, eccentricity) based on the calculated image moment and spatial data and assessing the pulse width of a light scatter detector output signal. In another example, methods include assessing one or more properties of the object (size, center of mass, eccentricity) based on the calculated image moment and spatial data and assessing the pulse height of a light scatter detector output signal. In yet another example, methods include assessing one or more properties of the object (size, center of mass, eccentricity) based on the calculated image moment and spatial data and assessing the pulse area of a light scatter detector output signal.

In certain instances, methods include: 1) assessing one or more properties of the object based on the calculated image moment and generated image; and 2) assessing a light scatter detector output signal from the object in the interrogation region of the flow stream. In these embodiments, light scatter detector output signal may be a forward light scatter detector output or a side light scatter detector output or a combination thereof. In embodiments, the light scatter detector output signal may be a signal pulse width, a signal pulse height and a signal pulse area or a combination thereof. In one example, methods include assessing one or more properties of the object (size, center of mass, eccentricity) based on the calculated image moment and generated image and assessing the pulse width of a light scatter detector output signal. In another example, methods include assessing one or more properties of the object (size, center of mass, eccentricity) based on the calculated image moment and generated image and assessing the pulse height of a light scatter detector output signal. In yet another example, methods include assessing one or more properties of the object (size, center of mass, eccentricity) based on the calculated image moment and generated image and assessing the pulse area of a light scatter detector output signal.

In certain embodiments, methods include: 1) assessing each of the pulse width, the pulse height and pulse area of a light scatter detector output signal, followed by 2) assessing one or more properties of the object (size, center of mass, eccentricity) based on the calculated image moment and spatial data. In these embodiments, the light scatter detector output signals may be collected from one or more of a side scatter detector and a forward scatter detector. In some instances, light scatter detector output signals used in the subject methods according to these embodiments are collected from a side scatter detector. In other instances, light scatter detector output signals used in the subject methods are collected from a forward scatter detector. In yet other instances, light scatter detector output signals used in the subject methods are collected from both a side scatter detector and a forward scatter detector.

In certain embodiments, methods include: 1) assessing each of the pulse width, the pulse height and pulse area of a light scatter detector output signal, followed by 2) assessing one or more properties of the object (size, center of mass, eccentricity) based on the calculated image moment and generated image. In these embodiments, the light scatter detector output signals may be collected from one or more of a side scatter detector and a forward scatter detector. In some instances, light scatter detector output signals used in the subject methods according to these embodiments are collected from a side scatter detector. In other instances, light scatter detector output signals used in the subject methods are collected from a forward scatter detector. In yet other instances, light scatter detector output signals used in the subject methods are collected from both a side scatter detector and a forward scatter detector.

In some instances, methods include determining that the object is a horizontal cell aggregate where two or more cells are aligned together across a horizontal axis of the flow stream, such as 3 or more cells, such as 4 or more cells and including 5 or more cells. In other instances, methods include determining that the object is a vertical cell aggregate where two or more cells are aligned together along a vertical axis (i.e., longitudinal axis) of the flow stream, such as 3 or more cells, such as 4 or more cells and including 5 or more cells. In yet other instances, methods include determining that the object is combination cell aggregate having two or more cells aligned together across a horizontal axis and having two or more cells aligned together along a vertical axis.

FIGS. 1A and 1B depict images of imaged cell aggregates according to certain embodiments. FIG. 1A depicts a vertically oriented cell aggregate having two cells aligned together along a vertical axis (i.e., along the longitudinal axis of the flow stream). In some embodiments, the object in FIG. 1A can be identified as a vertically aligned cell aggregate based on a calculated second order image moment along the y-axis. FIG. 1B depicts a horizontally oriented cell aggregate having two cells aligned together along a horizontal axis (i.e., orthogonal to the longitudinal axis of the flow stream). In some embodiments, the object in FIG. 1B can be identified as a horizontally aligned cell aggregate based on a calculated second order image moment along the x-axis.

Figure 2:
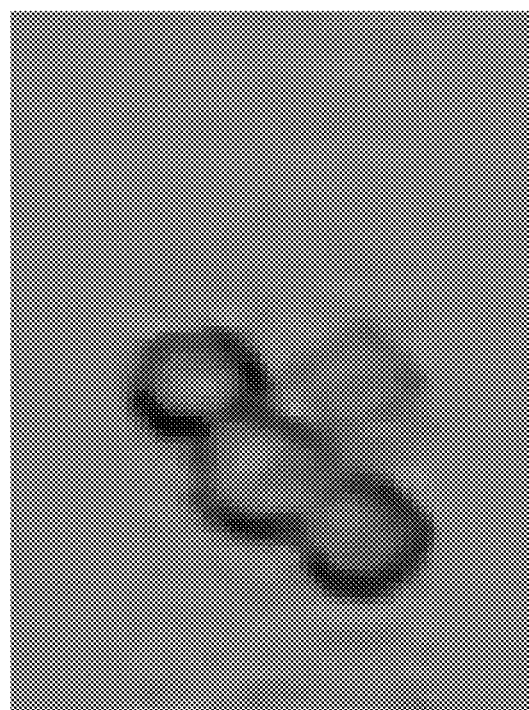
Figure 2:
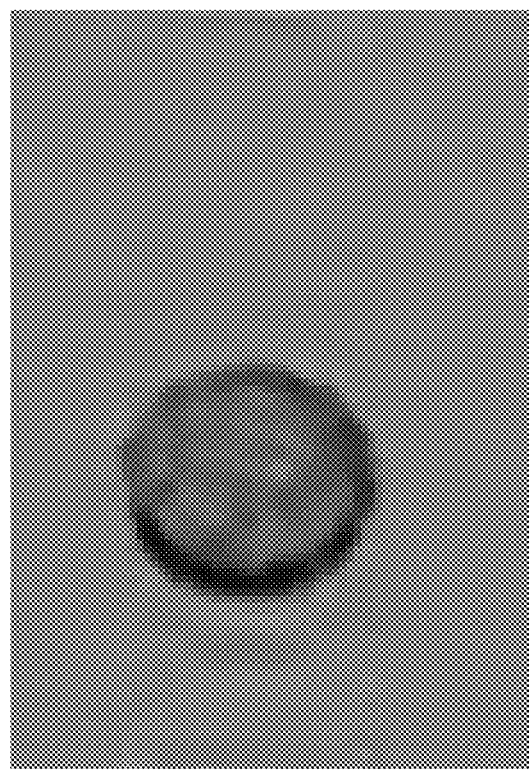

FIGS. 2A and 2B depicts the use of images and calculated eccentricity to discriminate between a single cell and an aggregate of cells according to certain embodiments. FIG. 2A depicts a single cell and FIG. 2B depicts an aggregate of 4 cells. Based on light scatter detector output signals, the single cell in FIG. 2A and the cell aggregate in FIG. 2B exhibit similar output signal parameters (e.g., output signal pulse width, pulse height and pulse area). By generating the images depicted in FIGS. 2A and 2B and calculating the eccentricity, the object in FIG. 2A can be correctly identified as being a single cell according to the subject methods and the object in FIG. 2B can be correctly identified as being a cell aggregate.

Figure 3:
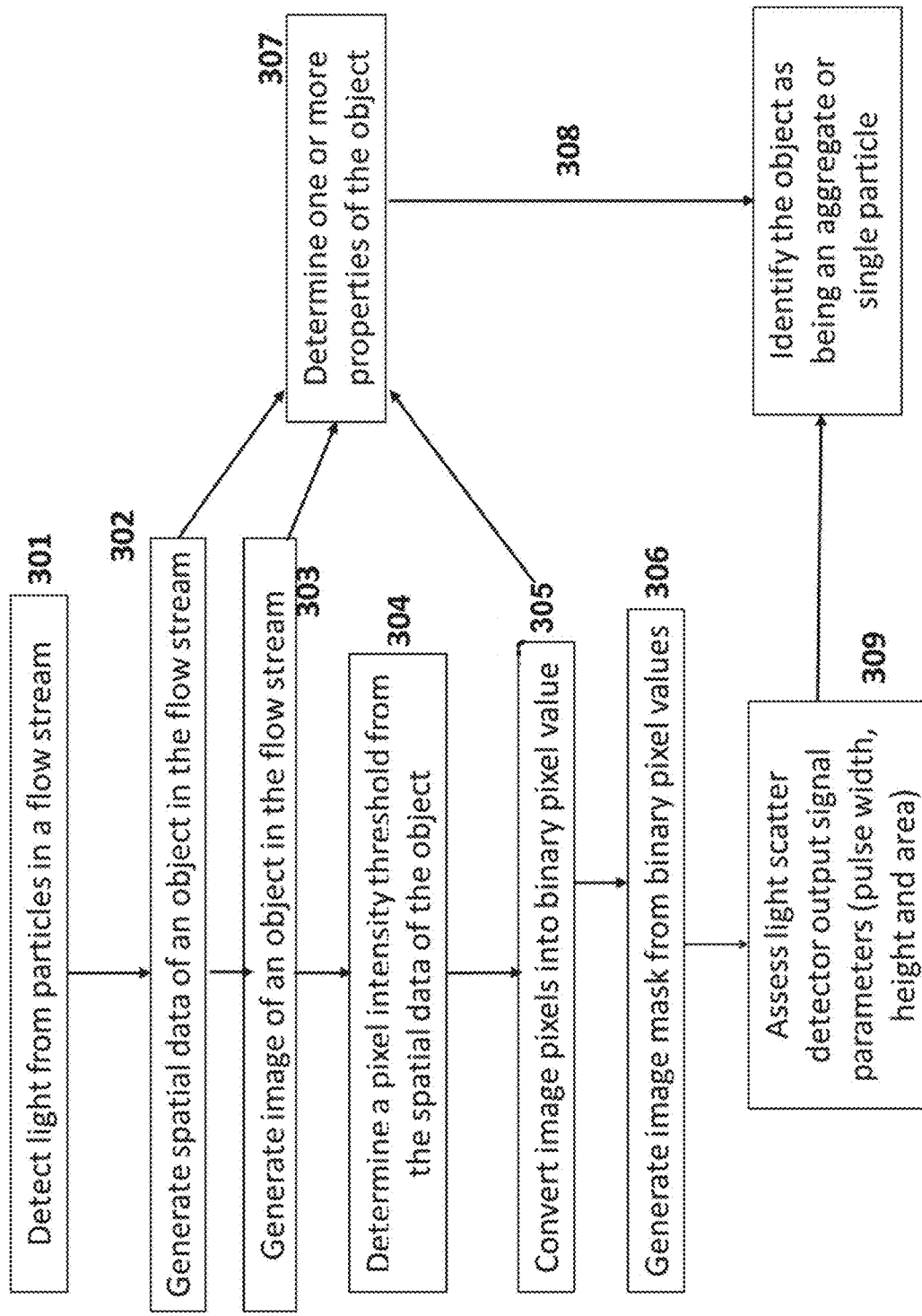
FIG. 3 depicts a flow chart for imaging and characterizing a particle in a flow stream according to certain embodiments.

FIG. 3 depicts a flow chart for imaging and characterizing an object in a flow stream according to certain embodiments. At step 301, light (light absorption, scattered light or emission) from an object in the flow stream are detected. At step 302, spatial data of the object is generated. At step 303, an image (e.g., a greyscale image) of the object is generated. At step 304, a pixel intensity threshold is determined based on the pixels from the image. In certain embodiments, at step 305, each pixel in the image is converted to a binary pixel value by comparing the intensity of each pixel against the determined pixel intensity threshold. An image mask is then generated using the binary pixel values at step 306. One or more properties of the imaged object is determined from the spatial data, generated image (or image mask) at step 307. Based on the determined properties, the object is identified as being an aggregate (e.g., a cell aggregate) or a single particle (e.g., a single cell) at step 308. In some instances, light scatter detector output signals (pulse width, pulse height and pulse area) are assessed (step 309) and are also used to identify the object.

As summarized above, methods of the present disclosure also include sorting the object based on the spatial data, generated image, generated image mask, a calculated image moment, one or more determined properties of the object (e.g., size, center of mass, eccentricity) or a combination thereof. The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, methods may include sorting 2 or more components of the sample, such as 3 or more components, such as 4 or more components, such as 5 or more components, such as 10 or more components, such as 15 or more components and including sorting 25 or more components of the sample. In some embodiments, the object is identified as being a single cell and is sorted to a first sample component collection location. In other embodiments, the object is identified as being a cell aggregate and is sorted to a second sample component collection location. In some instances, the first sample component collection location includes a sample collection container and the second sample component collection location includes a waste collection container.

In sorting the object from the sample in the flow stream, methods include data acquisition, analysis and recording, such as with a computer, where multiple data channels record data from each detector used in generating the image or image mask of the object (e.g., scatter detectors, brightfield photodetectors or fluorescence detectors). In these embodiments, analysis includes classifying and counting particles such that each particle is present as a set of digitized parameter values. The subject systems (described below) may be set to trigger on a selected parameter in order to distinguish the particles of interest from background and noise.

A particular subpopulation of interest (e.g., single cells) may then further analyzed by "gating" based on the data collected for the entire population. To select an appropriate gate, the data is plotted so as to obtain the best separation of subpopulations possible. This procedure may be performed by plotting image moment or one or more of the determined properties (e.g., size, center of mass, eccentricity). In other embodiments, methods include plotting forward light scatter (FSC) vs. side (i.e., orthogonal) light scatter (SSC) on a two-dimensional dot plot. In yet other embodiments, methods include plotting one or more of the determined properties (e.g., size, center of mass, eccentricity) against one or more of forward light scatter (FSC) and side (i.e., orthogonal) light scatter (SSC). In still other embodiments, methods include gating the population of particles for forward light scatter (FSC) and side (i.e., orthogonal) light scatter (SSC), followed by gating based on one or more of the determined properties (e.g., size, center of mass, eccentricity) based on the image of the object. In still other embodiments, methods include gating the population of particles based on one or more of the determined properties (e.g., size, center of mass, eccentricity) based on the image of the object, followed by gating the population of particles for forward light scatter (FSC) and side (i.e., orthogonal) light scatter (SSC). In yet other embodiments, methods include assessing the forward light scatter (FSC) and side (i.e., orthogonal) light scatter (SSC) output signals and the one or more of the determined properties (e.g., size, center of mass, eccentricity) based on the image of the object and classifying the object as being a single particle (e.g., single cell) or an aggregate (e.g., cell aggregate), followed by gating based on the classification of the object.

A subpopulation of objects is then selected (i.e., those single cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

In some embodiments, methods for sorting components of sample include sorting particles (e.g., cells in a biological sample) with particle sorting module having deflector plates, such as described in U.S. Patent Publication No. 2017/0299493, filed on Mar. 28, 2017, the disclosure of which is incorporated herein by reference. In certain embodiments, cells of the sample are sorted using a sort decision module having a plurality of sort decision units, such as those described in U.S. Provisional Patent Application No. 62/803,264, filed on Feb. 8, 2019, the disclosure of which is incorporated herein by reference.

Systems for Characterizing Particles in a Sample

As summarized above, aspects of the present disclosure include a system for characterizing particles of a sample (e.g., cells in a biological sample). Systems according to certain embodiments include a light source configured to irradiate a sample having cells in a flow stream, a light detection system having a photodetector and a processor having memory operably coupled to the processor such that the memory includes instructions stored thereon, which when executed by the processor, cause the processor to generate spatial data of an object in the flow stream in an interrogation region and to determine whether the object in the flow stream is a cell aggregate based on the spatial data.

Systems of interest include a light source configured to irradiate a sample in a flow stream. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser; copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, systems include a light detection system having one or more photodetectors for detecting and measuring light from the sample. Photodetectors of interest may be configured to measure light absorption (e.g., for bright-field light data), light scatter (e.g., forward or side scatter light data), light emission (e.g., fluorescence light data) from the sample or a combination thereof. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm, where the surface area of each photodetector (e.g., photodiode) in the array ranges from 25 to µm² to 10000 µm², such as from 50 to µm² to 9000 µm², such as from 75 to µm² to 8000 µm², such as from 100 to µm² to 7000 µm², such as from 150 to µm² to 6000 µm² and including from 200 to µm² to 5000 µm².

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 mm² to 10000 mm², such as from 0.5 mm² to 5000 mm², such as from 1 mm² to 1000 mm², such as from 5 mm² to 500 mm², and including from 10 mm² to 100 mm².

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In embodiments, systems are configured to analyze light from the irradiated sample and to generate spatial data of the object in the flow stream. Systems of interest may include computer controlled systems where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating a flow cell having a sample in a flow stream with a light source and detecting light from the flow cell with a light detection system having a plurality of photodetectors and generating spatial data of the object in the flow stream and determining whether the object is an aggregate (e.g., cell aggregate) based on the spatial data.

In some embodiments, systems are configured to generate an image of an object in the flow stream in real time, such as for example so that one or more components of the sample can be sorted based on the generated image. In some embodiments, systems include a computer having a computer readable storage medium with a computer program stored thereon, where the computer program when loaded on the computer includes instructions for irradiating a flow cell having a sample in a flow stream with a light source and detecting light from the flow cell with a light detection system having a plurality of photodetectors and generating an image of an object in the flow stream and determining whether the imaged object is an aggregate (e.g., cell aggregate) based on the generated image.

In some embodiments, systems include a computer having a computer readable storage medium with a computer program stored thereon, where the computer program when loaded on the computer further includes instructions for generating an image of an object in the flow stream from the detected light. The image may be generated from detected light absorption, detected light scatter, detected light emission or any combination thereof. In certain embodiments, the image of the object in the flow stream is a greyscale image. In some instances, the greyscale image is generated by the subject system from light absorption detected from the sample, such as from a brightfield light detector. In these instances, the greyscale image is generated based on brightfield image data from the cell in the flow stream. In other instances, the greyscale image is generated by the subject system from light scatter detected from the sample, such as from a side scatter detector, a forward scatter detector or a combination of a side scatter detector and forward scatter detector. In these instances, the greyscale image is generated based on scattered light image data. In yet other instances, the greyscale image is generated by the subject system from emitted light from the sample, such as light from fluorophores added to the sample. In these instances, the greyscale image is generated based on fluorescent image data (i.e., imaging data from fluorescent compounds on or in the cell). In still other instances, the greyscale image is generated by the subject system from a combination of detected light absorption, detected light scatter and detected light emission.

The subject systems may be configured to generate one or more images of the object from the detected light. In some embodiments, a single image is generated from each form of detected light. For example, a first image of the object is generated from detected light absorption; a second image of the object is generated from detected light scatter and a third image of the object is generated from detected light emission. In other embodiments, two or more images are generated from each form of detected light, such as 3 or more, such as 4 or more, such as 5 or more and including 10 or more images or a combination thereof.

In some embodiments, systems include a computer having a computer readable storage medium with a computer program stored thereon, where the computer program when loaded on the computer further includes instructions for generating an image mask of the object. In these embodiments, systems include memory with instructions for determining a pixel intensity threshold value from the greyscale image. In some embodiments, the computer program includes instructions which when executed by the processor cause the processor to determine the pixel intensity threshold value from the greyscale image by minimizing the intra-class variance of the greyscale image and calculating a pixel intensity threshold that is based on the minimized intra-class variance (or where inter-class variance is maximal).

Systems include memory with instructions to compare each pixel in the greyscale image against the determined intensity threshold value and to convert each pixel to a binary pixel value. In some embodiments, the memory includes instructions to compare pixels along each horizontal row in the greyscale image against the determined intensity threshold value. In some instances, the memory includes instructions to compare pixels against the determined intensity threshold value from the left side of the greyscale image to the right side of the greyscale image. In other instances, the memory includes instructions to compare pixels against the determined intensity threshold value from the right side of the greyscale image to the left side of the greyscale image. In other embodiments, the memory includes instructions to compare pixels along each vertical column in the greyscale image against the determined intensity threshold value. In some instances, the memory includes instructions to compare pixels against the determined intensity threshold value from the top of the greyscale image to the bottom of the greyscale image along each vertical column. In other instances, the memory includes instructions to compare pixels against the determined intensity threshold value from the bottom of the greyscale image to the top of the greyscale image along each vertical column.

Depending on the type of light detected, each pixel is assigned a binary pixel value of 1 or a binary pixel value of 0. In one example, systems include a computer program that includes instructions for detecting light absorption (e.g., brightfield image data) from the flow stream and assigning a binary pixel value of 1 to each pixel in the greyscale image when the pixel intensity is less than the intensity threshold value and assigning a binary pixel value of 0 when the pixel intensity of the greyscale image is greater than the intensity threshold value. In another example, systems include a computer program that includes instructions for detecting light scatter from the object in the flow stream and assigning a binary pixel value of 1 to each pixel in the greyscale image when the pixel intensity is greater than the intensity threshold value and assigning a binary pixel value of 0 when the pixel intensity is less than the intensity threshold value. In yet another example, systems include a computer program that includes instructions for detecting fluorescence from the object in the flow stream and assigning a binary pixel value of 1 to each pixel in the greyscale image when the pixel intensity is greater than the intensity threshold value and assigning a binary pixel value of 0 when the pixel intensity is less than the intensity threshold value.

Where a binary pixel value is assigned by the subject system to each pixel in the greyscale image across a horizontal row, in some embodiments systems include a computer program that includes instructions for further determining the first pixel across the horizontal row having a binary pixel value of 1 and determining the last pixel in the horizontal row having a binary pixel value of 1. In one example, systems include a computer program that includes instructions for determining the first pixel from the left side of the horizontal row having an assigned binary pixel value of 1 and determining the last pixel from the left side of horizontal row having an assigned binary pixel value of 1. In another example, systems include a computer program that includes instructions for determining the first pixel from the right side of the horizontal row having an assigned binary pixel value of 1 and determining the last pixel from the right side of horizontal row having an assigned binary pixel value of 1. In other embodiments, systems include a computer program that includes instructions for further determining the first pixel across the horizontal row having a binary pixel value of 0 and determining the last pixel in the horizontal row having a binary pixel value of 0. In one example, systems include a computer program that includes instructions for determining the first pixel from the left side of the horizontal row having an assigned binary pixel value of 0 and determining the last pixel from the left side of horizontal row having an assigned binary pixel value of 0. In another example, systems include a computer program that includes instructions for determining the first pixel from the right side of the horizontal row having an assigned binary pixel value of 0 and determining the last pixel from the right side of horizontal row having an assigned binary pixel value of 0.

Where a binary pixel value is assigned to each pixel in the greyscale image along a vertical column, in some embodiments systems include a computer program that includes instructions for further determining the first pixel along the vertical column having a binary pixel value of 1 and determining the last pixel along the vertical column having a binary pixel value of 1. In one example, systems include a computer program that includes instructions for determining the first pixel from the top of the vertical column having an assigned binary pixel value of 1 and determining the last pixel from the top of the vertical column having an assigned binary pixel value of 1. In another example, systems include a computer program that includes instructions for determining the first pixel from the bottom of the vertical column having an assigned binary pixel value of 1 and determining the last pixel from the bottom of the vertical column having an assigned binary pixel value of 1. In other embodiments, systems include a computer program that includes instructions for further determining the first pixel along a vertical column having a binary pixel value of 0 and determining the last pixel in the vertical column having a binary pixel value of 0. In one example, systems include a computer program that includes instructions for determining the first pixel from the top of the vertical column having an assigned binary pixel value of 0 and determining the last pixel from the top of the vertical column having an assigned binary pixel value of 0. In another example, systems include a computer program that includes instructions for determining the first pixel from the bottom of the vertical column having an assigned binary pixel value of 0 and determining the last pixel from bottom of the vertical column having an assigned binary pixel value of 0.

In some embodiments, systems include a computer having a computer readable storage medium with a computer program stored thereon, where the computer program when loaded on the computer further includes instructions for determining one or more properties of the object based on the calculated image moment and spatial data. For example, systems may include memory having instructions for determining the size of the cell, the center of mass of the cell or the eccentricity of the cell based on the calculated image moment and spatial data. In these embodiments, systems are configured to calculate one or more image moments and then determine the characteristic of the cell using both the calculated image moment and spatial data.

In some embodiments, systems include a computer having a computer readable storage medium with a computer program stored thereon, where the computer program when loaded on the computer further includes instructions for determining one or more properties of the object based on the calculated image moment and generated image. For example, systems may include memory having instructions for determining the size of the cell, the center of mass of the cell or the eccentricity of the cell based on the calculated image moment and generated image of the object (e.g., image or image mask). In these embodiments, systems are configured to calculate one or more image moments and then determine the characteristic of the cell using both the calculated image moment and the image of the object.

In some instances, the center of mass may be calculated from the image moment and the generated image of the object. For example, systems may be configured to determine the center of mass of the object from the calculated image moment and the generated image according to:

$$\text{Center of Mass} = \frac{M_{1,0}}{M_{0,0}}$$

In other instances, the orientation of the object may be calculated from the image moment and the generated image of the object. For example, systems may be configured to determine the orientation of the object from the calculated image moment and the generated image according to:

$$\text{Orientation of cell} = \frac{1}{2}\arctan\frac{2\left(M_{1,1} - \frac{M_{1,0}M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In still other instances, the eccentricity of the object may be calculated from the image moment and the generated image of the object. For example, systems may be configured to determine the eccentricity of the object from the calculated image moment and the generated image according to:

$$\text{Eccentricity} = \frac{M_{2,0} - \frac{M_{2,0}^2}{M_{0,0}} + M_{0,2} - \frac{M_{0,2}^2}{M_{0,0}} - \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}} + M_{0,2} - \frac{M_{0,2}^2}{M_{0,0}} + \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In certain embodiments, systems include a computer having a computer readable storage medium with a computer program stored thereon, where the computer program when loaded on the computer further includes instructions for assessing one or more of: 1) the calculated size of the object; 2) the center of mass of the object; and 3) the eccentricity of the object and identifying whether the object is an aggregate of particles (e.g., a cell aggregate) or a single particle (e.g., a single cell). In some instances, systems are configured to determine that the object is an aggregate based on the calculated size of the object. In other instances, systems are configured to determine that the object is an aggregate based on the calculated center of mass of the object. In yet other instances, systems are configured to determine that the object is an aggregate based on the calculated eccentricity of the object.

In certain instances, systems include memory having instructions for: 1) assessing one or more properties of the object based on the calculated image moment and spatial data; and 2) assessing a light scatter detector output signal from the object in the interrogation region of the flow stream. In these embodiments, light scatter detector output signal may be a forward light scatter detector output or a side light scatter detector output or a combination thereof. In embodiments, the light scatter detector output signal may be a signal pulse width, a signal pulse height and a signal pulse area or a combination thereof. In one example, systems include memory having instructions for assessing one or more properties of the object (size, center of mass, eccentricity) based on the calculated image moment and spatial data and assessing the pulse width of a light scatter detector output signal. In another example, systems include memory having instructions for assessing one or more properties of the object (size, center of mass, eccentricity) based on the calculated image moment and spatial data and assessing the pulse height of a light scatter detector output signal. In yet another example, systems include memory having instructions for assessing one or more properties of the object (size, center of mass, eccentricity) based on the calculated image moment and spatial data and assessing the pulse area of a light scatter detector output signal.

In certain embodiments, systems include memory having instructions for: 1) assessing each of the pulse width, the pulse height and pulse area of a light scatter detector output signal, followed by 2) assessing one or more properties of the object (size, center of mass, eccentricity) based on the calculated image moment and spatial data. In these embodiments, the light scatter detector output signals may be collected from one or more of a side scatter detector and a forward scatter detector. In some instances, light scatter detector output signals used by the subject systems according to these embodiments are collected from a side scatter detector. In other instances, light scatter detector output signals used are collected from a forward scatter detector. In yet other instances, light scatter detector output signals used are collected from both a side scatter detector and a forward scatter detector.

In certain instances, systems include memory having instructions for: 1) assessing one or more properties of the object based on the calculated image moment and generated image; and 2) assessing a light scatter detector output signal from the object in the interrogation region of the flow stream. In these embodiments, light scatter detector output signal may be a forward light scatter detector output or a side light scatter detector output or a combination thereof. In embodiments, the light scatter detector output signal may be a signal pulse width, a signal pulse height and a signal pulse area or a combination thereof. In one example, systems include memory having instructions for assessing one or more properties of the object (size, center of mass, eccentricity) based on the calculated image moment and generated image and assessing the pulse width of a light scatter detector output signal. In another example, systems include memory having instructions for assessing one or more properties of the object (size, center of mass, eccentricity)

based on the calculated image moment and generated image and assessing the pulse height of a light scatter detector output signal. In yet another example, systems include memory having instructions for assessing one or more properties of the object (size, center of mass, eccentricity) based on the calculated image moment and generated image and assessing the pulse area of a light scatter detector output signal.

In certain embodiments, systems include memory having instructions for: 1) assessing each of the pulse width, the pulse height and pulse area of a light scatter detector output signal, followed by 2) assessing one or more properties of the object (size, center of mass, eccentricity) based on the calculated image moment and generated image. In these embodiments, the light scatter detector output signals may be collected from one or more of a side scatter detector and a forward scatter detector. In some instances, light scatter detector output signals used by the subject systems according to these embodiments are collected from a side scatter detector. In other instances, light scatter detector output signals used are collected from a forward scatter detector. In yet other instances, light scatter detector output signals used are collected from both a side scatter detector and a forward scatter detector.

In some instances, systems include memory having instructions for determining that the object is a horizontal cell aggregate where two or more cells are aligned together across a horizontal axis of the flow stream, such as 3 or more cells, such as 4 or more cells and including 5 or more cells. In other instances, systems include memory having instructions for determining that the object is a vertical cell aggregate where two or more cells are aligned together along a vertical axis (i.e., longitudinal axis) of the flow stream, such as 3 or more cells, such as 4 or more cells and including 5 or more cells. In yet other instances, systems include memory having instructions for determining that the object is combination cell aggregate having two or more cells aligned together across a horizontal axis and having two or more cells aligned together along a vertical axis.

In some embodiments, systems include memory having instructions to calculate the spatial data from the frequency-encoded data of the object in the flow stream. In these embodiments, systems are configured to calculate the spatial data by performing a transform of frequency-encoded data. In one example, the spatial data is calculated by performing a Fourier transform (FT) of the frequency-encoded data. In another example, the spatial data is calculated by performing a discrete Fourier transform (DFT) of the frequency-encoded data. In yet another example, the spatial data is calculated by performing a short time Fourier transform (STFT) of the frequency-encoded data. In still another example, the spatial data is calculated with a digital lock-in amplifier to heterodyne and de-multiplex the frequency-encoded data.

Sorting systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

In certain embodiments, the subject systems include one or more optical adjustment components for adjusting the light such as light irradiated onto the sample (e.g., from a laser) or light collected from the sample (e.g., scattered, fluorescence). For example, the optical adjustment may be to increase the dimensions of the light, the focus of the light or to collimate the light. In some instances, optical adjustment is a magnification protocol so as to increase the dimensions of the light (e.g., beam spot), such as increasing the dimensions by 5% or more, such as by 10% or more, such as by 25% or more, such as by 50% or more and including increasing the dimensions by 75% or more. In other embodiments, optical adjustment includes focusing the light so as to reduce the light dimensions, such as by 5% or greater, such as by 10% or greater, such as by 25% or greater, such as by 50% or greater and including reducing the dimensions of the beam spot by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam (e.g., reducing the beam profile of a laser)

In some embodiments, the optical adjustment component is a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75 and including a magnification ratio of from 0.55 to 0.7, for example a magnification ratio of 0.6. For example, the focusing lens is, in certain instances, a double achromatic de-magnifying lens having a magnification ratio of about 0.6. The focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In other embodiments, the optical adjustment component is a collimator. The collimator may be any convenient collimating protocol, such as one or more mirrors or curved lenses or a combination thereof. For example, the collimator is in certain instances a single collimating lens. In other instances, the collimator is a collimating mirror. In yet other instances, the collimator includes two lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In some embodiments, the subject systems include include a flow cell nozzle having a nozzle orifice configured to flow a flow stream through the flow cell nozzle. The subject flow cell nozzle has an orifice which propagates a fluidic sample to a sample interrogation region, where in some embodiments, the flow cell nozzle includes a proximal cylindrical portion defining a longitudinal axis and a distal frustoconical portion which terminates in a flat surface having the nozzle orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the nozzle chamber does not include a cylindrical portion and the entire flow cell nozzle chamber is frustoconically shaped. In these embodiments, the length of the frustoconical nozzle chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical nozzle chamber may range from 1 mm to 10 mm, such as from 2 mm to 9 mm, such as from 3 mm to 8 mm and including from 4 mm to 7 mm.

In embodiments, the sample flow stream emanates from an orifice at the distal end of the flow cell nozzle. Depending on the desired characteristics of the flow stream, the flow cell nozzle orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell nozzle of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell nozzle includes a sample injection port configured to provide a sample to the flow cell nozzle. In embodiments, the sample injection system is configured to provide suitable flow of sample to the flow cell nozzle chamber. Depending on the desired characteristics of the flow stream, the rate of sample conveyed to the flow cell nozzle chamber by the sample injection port may be 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more, such as 100 µL/sec or more, such as 150 µL/sec or more, such as 200 µL/sec or more, such as 250 µL/sec or more, such as 300 µL/sec or more, such as 350 µL/sec or more, such as 400 µL/sec or more, such as 450 µL/sec or more and including 500 µL/sec or more. For example, the sample flow rate may range from 1 µL/sec to about 500 µL/sec, such as from 2 µL/sec to about 450 µL/sec, such as from 3 µL/sec to about 400 µL/sec, such as from 4 µL/sec to about 350 µL/sec, such as from 5 µL/sec to about 300 µL/sec, such as from 6 µL/sec to about 250 µL/sec, such as from 7 µL/sec to about 200 µL/sec, such as from 8 µL/sec to about 150 µL/sec, such as from 9 µL/sec to about 125 µL/sec and including from 10 µL/sec to about 100 µL/sec.

The sample injection port may be an orifice positioned in a wall of the nozzle chamber or may be a conduit positioned at the proximal end of the nozzle chamber. Where the sample injection port is an orifice positioned in a wall of the nozzle chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell nozzle chamber. For example, the sample injection port may be a conduit positioned to have the orifice of the sample injection port in line with the flow cell nozzle orifice. Where the sample injection port is a conduit positioned in line with the flow cell nozzle orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell nozzle also includes a sheath fluid injection port configured to provide a sheath fluid to the flow cell nozzle. In embodiments, the sheath fluid injection system is configured to provide a flow of sheath fluid to the flow cell nozzle chamber, for example in conjunction with the sample to produce a laminated flow stream of sheath fluid surrounding the sample flow stream. Depending on the desired characteristics of the flow stream, the rate of sheath fluid conveyed to the flow cell nozzle chamber by the may be 25 µL/sec or more, such as 50 µL/sec or more, such as 75 µL/sec or more, such as 100 µL/sec or more, such as 250 µL/sec or more, such as 500 µL/sec or more, such as 750µL/sec or more, such as 1000 µL/sec or more and including 2500 µL/sec or more. For example, the sheath fluid flow rate may range from 1 µL/sec to about 500 µL/sec, such as from 2 µL/sec to about 450 µL/sec, such as from 3 µL/sec to about 400 µL/sec, such as from 4 µL/sec to about 350 µL/sec, such as from 5 µL/sec to about 300 µL/sec, such as from 6 µL/sec to about 250 µL/sec, such as from 7 µL/sec to about 200 µL/sec, such as from 8 µL/sec to about 150 µL/sec, such as from 9 µL/sec to about 125 µL/sec and including from 10 µL/sec to about 100 µL/sec.

In some embodiments, the sheath fluid injection port is an orifice positioned in a wall of the nozzle chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

The subject systems, in certain instances, include a sample interrogation region in fluid communication with the flow cell nozzle orifice. In these instances, a sample flow stream emanates from an orifice at the distal end of the flow cell nozzle and particles in the flow stream may be irradiated with a light source at the sample interrogation region. The size of the interrogation region may vary depending on the properties of the flow nozzle, such as the size of the nozzle orifice and sample injection port size. In embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more.

The interrogation region may be configured to facilitate irradiation of a planar cross-section of an emanating flow stream or may be configured to facilitate irradiation of a diffuse field (e.g., with a diffuse laser or lamp) of a predetermined length. In some embodiments, the interrogation region includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm. As such, the interrogation region may be formed from any transparent material which passes the desired range of wavelength, including but not limited to optical glass, borosilicate glass, Pyrex glass, ultraviolet quartz, infrared quartz, sapphire as well as plastic, such as polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials, including polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly (hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly (ethylene isophthalate); poly(alkylene 2,6-naphthalene-dicarboxylates) such as poly(ethylene 2,6-naphthalenedicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly ([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly (tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc. In some embodiments, the subject systems include a cuvette positioned in the sample interrogation region. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In some embodiments, the subject systems include a particle sorting component for sorting cells of the sample. In certain instances, the particle sorting component is a particle sorting module such as those described in U.S. Patent Publication No. 201710299493, filed on Mar. 28, 2017 and U.S. Provisional Patent Application No. 62/752,793 filed on Oct. 30, 2018, the disclosures of which is incorporated herein by reference. In certain embodiments, the particle sorting component include one or more droplet deflectors such as those described in U.S. Patent Publication No. 2018/0095022, filed on Jun. 14, 2017, the disclosure of which is incorporated herein by reference.

In some embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) Ann Clin Biochem. January; 49(pt 1):17-28; Linden, et. al., *Semin Throm Hemost.* 2004 October; 30(5):502-11; Alison, et al. J Pathol, 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain instances, the subject systems are flow cytometry systems configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

Integrated Circuit Devices

Aspects of the present disclosure also include integrated circuit devices programmed to generate spatial data of an object in a flow stream and to determine whether the object is an aggregate (e.g., cell aggregate) based on the spatial data. In certain embodiments, the subject integrated circuit devices are configured to sort the object. In some embodiments, integrated circuit devices of interest include a field programmable gate array (FPGA). In other embodiments, integrated circuit devices include an application specific integrated circuit (ASIC). In yet other embodiments, integrated circuit devices include a complex programmable logic device (CPLD).

Integrated circuit devices according to certain embodiments are programmed to generate spatial data of an object in the flow stream. In some embodiments, the integrated circuit device is programmed to generate spatial data from data signals from a light absorption detector (e.g., brightfield image data). In other embodiments, the integrated circuit device is programmed to generate spatial data from data signals from a light scatter detector (e.g., forward scatter image data, side scatter image data). In yet other embodiments, the integrated circuit device is programmed to generate spatial data from data signals from a light emission detector (e.g., fluorescent marker image data). In still other instances, the integrated circuit device is programmed to generate spatial data of the object from a combination of two or more of detected light absorption, detected light scatter and detected fluorescence.

In some embodiments, the integrated circuit device is programmed for determining the size of the object based on the spatial data. In other embodiments, integrated circuit device is programmed for determining the center of mass of the object based on the spatial data. In yet other embodiments, integrated circuit device is programmed for determining the eccentricity of the object based on the spatial data. In certain embodiments, an image moment is calculated based on the spatial data. In some instances, integrated circuit device is programmed for calculating a first order image moment of the object along a horizontal axis. In other instances, integrated circuit device is programmed for calculating a second order image moment of the object along a horizontal axis. In yet other instances, integrated circuit device is programmed for calculating a first order image moment of the object along a vertical axis. In still other instances, integrated circuit device is programmed for calculating a second order image moment of the object along a vertical axis.

In some embodiments, the integrated circuit device is programmed to generate an image of the object in the flow stream from detected light. The image may be generated from detected light absorption, detected light scatter, detected light emission or any combination thereof. The subject integrated circuit devices may be programmed to generate one or more images of the object from the detected light. In some embodiments, a single image is generated from each from of detected light. For example, a first image of the object is generated from detected light absorption; a second image of the object is generated from detected light scatter and a third image of the object is generated from detected light emission. In other embodiments, two or more images are generated from each form of detected light, such as 3 or more, such as 4 or more, such as 5 or more and including 10 or more images or a combination thereof.

In some embodiments, the integrated circuit device is programmed to generate an image mask of the object. In these embodiments, the integrated circuit device is programmed to determine a pixel intensity threshold value from the greyscale image. In some embodiments, the integrated circuit device is programmed to determine the pixel intensity threshold value from the greyscale image by minimizing the intra-class variance of the greyscale image and calculating a pixel intensity threshold that is based on the minimized intra-class variance (or where inter-class variance is maximal).

The integrated circuit device is programmed to compare each pixel in the greyscale image against the determined intensity threshold value and to convert each pixel to a binary pixel value. In some embodiments, the integrated circuit device is programmed to compare pixels along each horizontal row in the greyscale image against the determined intensity threshold value. In some instances, the integrated circuit device is programmed to compare pixels against the determined intensity threshold value from the left side of the greyscale image to the right side of the greyscale image. In other instances, the integrated circuit device is programmed to compare pixels against the determined intensity threshold value from the right side of the greyscale image to the left side of the greyscale image. In other embodiments, the integrated circuit device is programmed to compare pixels along each vertical column in the greyscale image against the determined intensity threshold value. In some instances, the integrated circuit device is programmed to compare pixels against the determined intensity threshold value from the top of the greyscale image to the bottom of the greyscale image along each vertical column. In other instances, the integrated circuit device is programmed to compare pixels against the determined intensity threshold value from the bottom of the greyscale image to the top of the greyscale image along each vertical column.

Depending on the type of light detected, each pixel is assigned a binary pixel value of 1 or a binary pixel value of 0. In one example, the integrated circuit device is programmed to detect light absorption (e.g., brightfield image data) from the flow stream and assign a binary pixel value of 1 to each pixel in the greyscale image when the pixel intensity is less than the intensity threshold value and assigning a binary pixel value of 0 when the pixel intensity of the greyscale image is greater than the intensity threshold value. In another example, the integrated circuit device is programmed to detect light scatter from the object in the flow stream and assign a binary pixel value of 1 to each pixel in the greyscale image when the pixel intensity is greater than the intensity threshold value and assigning a binary pixel value of 0 when the pixel intensity is less than the intensity threshold value. In yet another example, the integrated circuit device is programmed to detect fluorescence from the object in the flow stream and assign a binary pixel value of 1 to each pixel in the greyscale image when the pixel intensity is greater than the intensity threshold value and assigning a binary pixel value of 0 when the pixel intensity is less than the intensity threshold value.

Where a binary pixel value is assigned by the subject system to each pixel in the greyscale image across a horizontal row, in some embodiments the integrated circuit device is programmed to determine the first pixel across the horizontal row having a binary pixel value of 1 and determine the last pixel in the horizontal row having a binary pixel value of 1. In one example, the integrated circuit device is programmed to determine the first pixel from the left side of the horizontal row having an assigned binary pixel value of 1 and determine the last pixel from the left side of horizontal row having an assigned binary pixel value of 1. In another example, the integrated circuit device is programmed to determine the first pixel from the right side of the horizontal row having an assigned binary pixel value of 1 and determine the last pixel from the right side of horizontal row having an assigned binary pixel value of 1. In other embodiments, the integrated circuit device is programmed to determine the first pixel across the horizontal row having a binary pixel value of 0 and determine the last pixel in the horizontal row having a binary pixel value of 0.

In one example, the integrated circuit device is programmed to determine the first pixel from the left side of the horizontal row having an assigned binary pixel value of 0 and determine the last pixel from the left side of horizontal row having an assigned binary pixel value of 0. In another example, the integrated circuit device is programmed to determine the first pixel from the right side of the horizontal row having an assigned binary pixel value of 0 and determine the last pixel from the right side of horizontal row having an assigned binary pixel value of 0.

Where a binary pixel value is assigned to each pixel in the greyscale image along a vertical column, in some the integrated circuit device is programmed to determine the first pixel along the vertical column having a binary pixel value of 1 and determine the last pixel along the vertical column having a binary pixel value of 1. In one example, the integrated circuit device is programmed to determine the first pixel from the top of the vertical column having an assigned binary pixel value of 1 and determine the last pixel from the top of the vertical column having an assigned binary pixel value of 1. In another example, the integrated circuit device is programmed to determine the first pixel from the bottom of the vertical column having an assigned binary pixel value of 1 and determine the last pixel from the bottom of the vertical column having an assigned binary pixel value of 1. In other embodiments, the integrated circuit device is programmed to determine the first pixel along a vertical column having a binary pixel value of 0 and determine the last pixel in the vertical column having a binary pixel value of 0. In one example, the integrated circuit device is programmed to determine the first pixel from the top of the vertical column having an assigned binary pixel value of 0 and determine the last pixel from the top of the vertical column having an assigned binary pixel value of 0. In another example, the integrated circuit device is programmed to determine the first pixel from the bottom of the vertical column having an assigned binary pixel value of 0 and determine the last pixel from bottom of the vertical column having an assigned binary pixel value of 0.

In some embodiments, the integrated circuit device is programmed to determine one or more properties of the object based on the calculated image moment and generated image. For example, the integrated circuit device is programmed to determine the size of the cell, the center of mass of the cell or the eccentricity of the cell based on the calculated image moment and generated image of the object (e.g., image or image mask). In these embodiments, the integrated circuit device is programmed to calculate one or more image moments and then determine the characteristic of the cell using both the calculated image moment and the image of the object.

In some instances, the center of mass may be calculated from the image moment and the generated image of the object. For example, the integrated circuit device may be programmed to determine the center of mass of the object from the calculated image moment and the generated image according to:

$$\text{Center of Mass} = \frac{M_{1,0}}{M_{0,0}}$$

In other instances, the orientation of the object may be calculated from the image moment and the generated image of the object. For example, the integrated circuit device is programmed to determine the orientation of the object from the calculated image moment and the generated image according to:

$$\text{Orientation of cell} = \frac{1}{2}\arctan\frac{2\left(M_{1,1} - \frac{M_{1,0}M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In still other instances, the eccentricity of the object may be calculated from the image moment and the generated image of the object. For example, the integrated circuit device is programmed to determine the eccentricity of the object from the calculated image moment and the generated image according to:

$$\text{Eccentricity} = \frac{M_{2,0} - \frac{M_{2,0}^2}{M_{0,0}} + M_{0,2} - \frac{M_{0,2}^2}{M_{0,0}} - \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}} + M_{0,2} - \frac{M_{0,2}^2}{M_{0,0}} + \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In certain embodiments, the integrated circuit device is programmed to assess one or more of: 1) the calculated size of the object; 2) the center of mass of the object; and 3) the eccentricity of the object and identify whether the object is an aggregate of particles (e.g., a cell aggregate) or a single particle (e.g., a single cell). In some instances, the integrated circuit device is programmed to determine that the object is an aggregate based on the calculated size of the object. In other instances, the integrated circuit device is programmed to determine that the object is an aggregate based on the calculated center of mass of the object. In yet other instances, the integrated circuit device is programmed to determine that the object is an aggregate based on the calculated eccentricity of the object.

In certain instances, the integrated circuit device is programmed to: 1) assess one or more properties of the object based on the calculated image moment and spatial data; and 2) assess light scatter detector output signals from the object in the interrogation region of the flow stream. In some embodiments, the integrated circuit device is programmed to assess output signals from a forward scatter light detector. In other embodiments, the integrated circuit device is programmed to assess output signals from a side scatter light detector. In certain embodiments, the integrated circuit device is programmed to assess the light scatter detector output signals for one or more of the pulse width, the pulse height and pulse area.

In certain instances, the integrated circuit device is programmed to: 1) assess one or more properties of the object based on the calculated image moment and generated image; and 2) assess a light scatter detector output signal from the object in the interrogation region of the flow stream. In these embodiments, light scatter detector output signal may be a forward light scatter detector output or a side light scatter detector output or a combination thereof. In embodiments, the light scatter detector output signal may be a signal pulse width, a signal pulse height and a signal pulse area or a combination thereof. In one example, the integrated circuit device is programmed to assess one or more properties of the object (size, center of mass, eccentricity) based on the calculated image moment and generated image and assess the pulse width of a light scatter detector output signal. In another example, the integrated circuit device is programmed to assess one or more properties of the object (size, center of mass, eccentricity) based on the calculated image moment and generated image and assess the pulse height of a light scatter detector output signal. In yet another example, the integrated circuit device is programmed to assess one or more properties of the object (size, center of mass, eccentricity) based on the calculated image moment and generated image and assess the pulse area of a light scatter detector output signal.

In certain embodiments, the integrated circuit device is programmed to: 1) assess each of the pulse width, the pulse height and pulse area of a light scatter detector output signal, followed by 2) assess one or more properties of the object (size, center of mass, eccentricity) based on the calculated image moment and spatial data. In these embodiments, the light scatter detector output signals may be collected from one or more of a side scatter detector and a forward scatter detector. In some instances, light scatter detector output signals used according to these embodiments are collected from a side scatter detector. In other instances, light scatter detector output signals used are collected from a forward scatter detector. In yet other instances, light scatter detector output signals used are collected from both a side scatter detector and a forward scatter detector.

In certain embodiments, the integrated circuit device is programmed to: 1) assess each of the pulse width, the pulse height and pulse area of a light scatter detector output signal, followed by 2) assess one or more properties of the object (size, center of mass, eccentricity) based on the calculated image moment and generated image. In these embodiments, the light scatter detector output signals may be collected from one or more of a side scatter detector and a forward scatter detector. In some instances, light scatter detector output signals used according to these embodiments are collected from a side scatter detector. In other instances, light scatter detector output signals used are collected from a forward scatter detector. In yet other instances, light scatter detector output signals used are collected from both a side scatter detector and a forward scatter detector.

In some instances, the integrated circuit device is programmed to determine that the object is a horizontal cell aggregate where two or more cells are aligned together across a horizontal axis of the flow stream, such as 3 or more cells, such as 4 or more cells and including 5 or more cells. In other instances, the integrated circuit device is programmed to determine that the object is a vertical cell aggregate where two or more cells are aligned together along a vertical axis (i.e., longitudinal axis) of the flow stream, such as 3 or more cells, such as 4 or more cells and including 5 or more cells. In yet other instances, the integrated circuit device is programmed to determine that the object is combination cell aggregate having two or more cells aligned together across a horizontal axis and having two or more cells aligned together along a vertical axis.

In some embodiments, the integrated circuit device is programmed to calculate the spatial data from the frequency-encoded data of the object in the flow stream. In these embodiments, the integrated circuit device is programmed to calculate the spatial data by performing a transform of frequency-encoded data. In one example, the spatial data is calculated by performing a Fourier transform (FT) of the frequency-encoded data. In another example, the spatial data is calculated by performing a discrete Fourier transform (DFT) of the frequency-encoded data. In yet another example, the spatial data is calculated by performing a short time Fourier transform (STFT) of the frequency-encoded data. In still another example, the spatial data is calculated with a digital lock-in amplifier to heterodyne and de-multiplex the frequency-encoded data.

Figure 4:
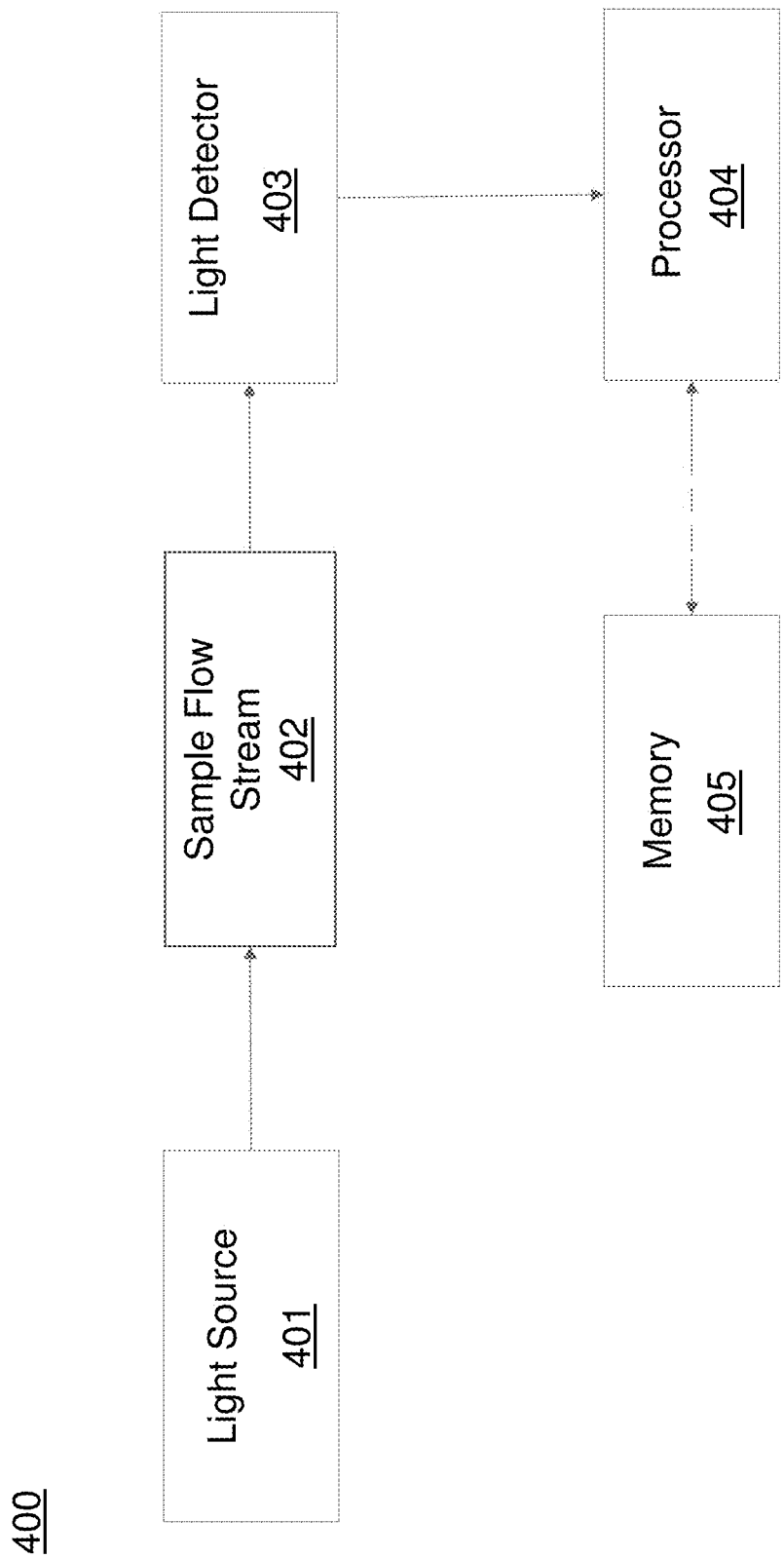
FIG. 4 depicts a system for determining whether an object in a flow stream is a cell aggregate according to certain embodiments.

FIG. 4 depicts system for determining whether an object in a flow stream is a cell aggregate according to certain embodiments. System 400 includes a light source 401 that is configured to irradiate a sample 402 having cells in a flow stream. Light from the irradiated flow stream is detected with light detector 403 to generate frequency encoded data (e.g., frequency-encoded fluorescence data). Processor 404 is operationally coupled to memory 405 which has instructions stored therein for generating from the frequency-encoded data spatial data that includes spatially encoded frequencies (e.g., beat frequencies) across the particle (e.g., across a horizontal axis) in the flow stream.

In certain embodiments, the integrated circuit device is programmed to make a sorting decision (as described above) based on the generated image or based on a calculated parameter (e.g., center of mass, eccentricity, etc.). In these embodiments, analysis includes classifying and counting particles such that each particle is present as a set of digitized parameter values. The subject integrated circuit device may be programmed to trigger a sorting component based on a selected parameter in order to distinguish the particles of interest from background and noise.

Kits

Aspects of the present disclosure further include kits, where kits include one or more of the integrated circuit devices described herein. In some embodiments, kits may further include programming for the subject systems, such as in the form of a computer readable medium (e.g., flash drive, USB storage, compact disk, DVD, Blu-ray disk, etc.) or instructions for downloading the programming from an internet web protocol or cloud server. Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods and computer systems find use in a variety of applications where it is desirable to analyze and sort particle components in a sample in a fluid medium, such as a biological sample. In some embodiments, the systems and methods described herein find use in flow cytometry characterization of biological samples labelled with fluorescent tags. In other embodiments, the systems and methods find use in spectroscopy of emitted light. In addition, the subject systems and methods find use in increasing the obtainable signal from light collected from a sample (e.g., in a flow stream). In certain instances, the present disclosure finds use in enhancing measurement of light collected from a sample that is irradiated in a flow stream in a flow cytometer. Embodiments of the present disclosure find use where it is desirable to provide a flow cytometer with improved cell sorting accuracy, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:

1. A method for determining whether an object in a flow stream is a cell aggregate, the method comprising:

detecting light from a sample comprising cells in a flow stream;

generating frequency-encoded data of an object in the flow stream in an interrogation region to obtain spatial data comprising spatially encoded frequencies across the object; and determining whether the object in the flow stream is a cell aggregate based on the spatial data.

2. The method according to claim 1, wherein detecting light from the sample in the flow stream comprises detecting light scatter from the sample in the flow stream.

3. The method according to claim 2, wherein the method comprises detecting forward scattered light from the sample in the flow stream.

4. The method according to claim 2, wherein the method comprises detecting side scattered light from the sample in the flow stream.

5. The method according to claim 1, further comprising determining the size of the object based on the spatial data.

6. The method according to claim 1, further comprising determining the center of mass of the object based on the spatial data.

7. The method according to claim 1, further comprising determining the eccentricity of the object based on the spatial data.

8. The method according to claim 1, further comprising calculating an image moment of the object based on the spatial data.

9. The method according to claim 8, wherein the method comprises calculating a first order image moment of the object along a horizontal axis.

10. The method according to claim 8, wherein the method comprises calculating a second order image moment of the object along a horizontal axis.

11. The method according to claim 8, wherein the method comprises calculating a first order image moment of the object along a vertical axis.

12. The method according to claim 8, wherein the method comprises calculating a second order image moment of the object along a vertical axis.

13. The method according to claim 12, wherein generating an image of the object in the interrogation region comprises generating an image mask of the object.

14. The method according to claim 13, wherein generating an image mask comprises:

generating a greyscale image of the object in the flow stream;

determining a pixel intensity threshold value from the greyscale image;

comparing each pixel from the greyscale image against the determined threshold value; and converting each pixel to a binary pixel value.

15. The method according to claim 14, wherein the image mask comprises pixels having a pixel value of 1.

16. The method according to claim 14, further comprising determining one or more of: the size of the object based on the generated image mask; the center of mass of the object based on the generated image mask and the eccentricity of the object based on the generated image mask.

17. The method according to claim 1, further comprising generating an image of the object from the spatial data.

18. A system comprising:

a light source configured to irradiate a sample comprising cells in a flow stream;

a light detection system comprising a photodetector; and a processor comprising memory operably coupled to the processor wherein the memory comprises instructions stored thereon, which when executed by the processor, cause the processor to:

generate frequency-encoded data of an object in the flow stream in an interrogation region to produce spatial data comprising spatially encoded frequencies across the object; and determine whether the object in the flow stream is a cell aggregate based on the spatial data.

19. The system according to claim 18, wherein the light detection system comprises a photodetector configured to detect light scatter from the sample in the flow stream.

20. An integrated circuit programmed to:

generate frequency encoded data of an object in the flow stream in an interrogation region to produce spatial data comprising spatially encoded frequencies across the object; and determine whether the object in the flow stream is a cell aggregate based on the spatial data.

* * * * *